United States Patent
Sugita et al.

(10) Patent No.: US 10,244,157 B2
(45) Date of Patent: Mar. 26, 2019

(54) INTERCHANGEABLE LENS APPARATUS AND IMAGE CAPTURING APPARATUS CAPABLE OF ACQUIRING IN-FOCUS STATE AT DIFFERENT IMAGE HEIGHTS, AND STORAGE MEDIUM STORING FOCUSING PROGRAM

(71) Applicant: CANON KABUSHIKI KAISHA, Tokyo (JP)

(72) Inventors: Shigenobu Sugita, Shimotsuke (JP); Yuichi Kosaka, Utsunomiya (JP); Takahito Nakamichi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 16 days.

(21) Appl. No.: 14/843,209

(22) Filed: Sep. 2, 2015

(65) Prior Publication Data
US 2016/0073005 A1 Mar. 10, 2016

(30) Foreign Application Priority Data

Sep. 5, 2014 (JP) .................................. 2014-180786
Nov. 5, 2014 (JP) .................................. 2014-224870

(51) Int. Cl.
*G02B 7/28* (2006.01)
*G02B 7/34* (2006.01)
(Continued)

(52) U.S. Cl.
CPC ......... *H04N 5/23212* (2013.01); *G02B 7/282* (2013.01); *G02B 7/34* (2013.01);
(Continued)

(58) Field of Classification Search
CPC ........... H04N 5/23209; H04N 5/23212; G02B 7/282; G02B 7/34–7/346; G03B 13/36; G03B 17/14; G01J 9/00–9/04
See application file for complete search history.

(56) References Cited

U.S. PATENT DOCUMENTS 8,416,336 B2 4/2013 Utagawa et al.
8,619,180 B2 12/2013 Kimura
(Continued)

FOREIGN PATENT DOCUMENTS

CN 101166235 A 4/2008
CN 103581547 A 2/2014
(Continued)

OTHER PUBLICATIONS

European Search Report issued in counterpart application No. EP15002597.1, dated Jan. 29, 2016.
(Continued)

*Primary Examiner* — Dennis A Hogue
(74) *Attorney, Agent, or Firm* — Rossi, Kimms & McDowell LLP

(57) ABSTRACT

The interchangeable lens apparatus provided with an image capturing optical system and being detachably attachable to an image capturing apparatus, the image capturing apparatus being configured to detect a defocus amount of the image capturing optical system by using a signal acquired by photoelectric conversion of an optical image formed by the image capturing optical system. The interchangeable lens apparatus includes a focus lens included in the image capturing optical system, and a memory to store information on a focus sensitivity indicating a relation between a unit movement amount of the focus lens and a displacement amount of the optical image. The information on the focus
(Continued)

sensitivity is information for enabling acquiring the focus sensitivity different depending on an image height.

21 Claims, 13 Drawing Sheets

(51) Int. Cl.
    *G03B 13/36*     (2006.01)
    *G03B 17/14*     (2006.01)
    *H04N 5/232*     (2006.01)

(52) U.S. Cl.
    CPC ............. *G03B 13/36* (2013.01); *G03B 17/14* (2013.01); *H04N 5/23209* (2013.01)

(56) References Cited

U.S. PATENT DOCUMENTS

| | | | |
|---|---|---|---|
| 8,866,955 B2 | 10/2014 | Kawarada | |
| 2004/0057712 A1* | 3/2004 | Sato | G03B 3/00 396/89 |
| 2009/0009633 A1* | 1/2009 | Suto | H04N 9/045 348/241 |
| 2012/0321288 A1* | 12/2012 | Ishibashi | G03B 13/36 396/111 |
| 2014/0036134 A1 | 2/2014 | Miyatani et al. | |
| 2015/0015696 A1* | 1/2015 | Delaney | H04N 5/232 348/86 |
| 2015/0029387 A1* | 1/2015 | Kawai | H04N 5/23212 348/347 |
| 2015/0234148 A1* | 8/2015 | Kusaka | G02B 7/34 348/349 |
| 2015/0244926 A1 | 8/2015 | Inoue | |
| 2017/0013199 A1* | 1/2017 | Kunugi | G02B 27/646 |

FOREIGN PATENT DOCUMENTS

| | | | |
|---|---|---|---|
| EP | 2889664 A1 | 7/2015 | |
| JP | 59151116 A | 8/1984 | |
| JP | 2004101946 A | 4/2004 | |
| JP | 2009290157 A | 12/2009 | |
| JP | 2010025997 A | 2/2010 | |
| JP | 2012203137 A | 10/2012 | |
| JP | 2013228571 A | 7/2013 | |
| JP | 2013228571 A | 11/2013 | |
| JP | WO 2014030668 A1 * | 2/2014 | ............ G02B 7/34 |
| JP | 2014123141 A | 7/2014 | |
| JP | 2016090649 A | 5/2016 | |
| WO | 2014030668 A1 | 2/2014 | |
| WO | 2014080674 A1 | 5/2014 | |

OTHER PUBLICATIONS

Office Action issued in Japanese Patent Application No. 2014-180786 dated Jun. 21, 2016. English translation provided.
Office Action issued in Japanese Patent Application No. 2014-224870 dated Jul. 5, 2016. English translation provided.
Office Action issued in Japanese Patent Application No. 2014-224870 dated Oct. 4, 2016. English translation provided.
Office Action issued in Chinese Appln. No. 201510541932.1 dated Dec. 5, 2017. English Translation provided.

\* cited by examiner

RATIO OF DEFOCUS AMOUNT IN VERTICAL LINE DETECTION IN
MARGINAL AREA TO THAT IN CENTRAL AREA

| 12 | 1.421 | 1.446 | 1.515 | 1.628 | 1.803 | 2.064 | 2.212 | 2.587 | 2.914 | 2.865 |
|---|---|---|---|---|---|---|---|---|---|---|
| 10 | 1.286 | 1.312 | 1.383 | 1.514 | 1.707 | 1.943 | 2.364 | 2.803 | 3.165 | 3.58 |
| 8 | 1.178 | 1.203 | 1.28 | 1.424 | 1.635 | 1.928 | 2.333 | 2.682 | 3.337 | 3.825 |
| 6 | 1.098 | 1.128 | 1.21 | 1.36 | 1.599 | 1.898 | 2.321 | 2.734 | 3.368 | 3.912 |
| 4 | 1.042 | 1.073 | 1.162 | 1.328 | 1.588 | 1.916 | 2.347 | 2.8 | 3.501 | 4.37 |
| 2 | 1.01 | 1.04 | 1.14 | 1.317 | 1.572 | 1.93 | 2.438 | 2.985 | 3.742 | 4.662 |
| 0 | 1 | 1.03 | 1.131 | 1.321 | 1.633 | 1.895 | 2.484 | 2.931 | 3.73 | 4.731 |
| IMAGE HEIGHT | 0 | 2 | 4 | 6 | 8 | 10 | 12 | 14 | 16 | 18 |

FIG. 3A

RATIO OF DEFOCUS AMOUNT IN HORIZONTAL LINE
DETECTION IN MARGINAL AREA TO THAT IN CENTRAL AREA

| 12 | 2.484 | 2.438 | 2.347 | 2.321 | 2.333 | 2.364 | 2.212 | 2.33 | 2.426 | 2.554 |
|---|---|---|---|---|---|---|---|---|---|---|
| 10 | 1.895 | 1.93 | 1.916 | 1.898 | 1.928 | 1.943 | 2.064 | 2.134 | 2.266 | 2.435 |
| 8 | 1.633 | 1.572 | 1.588 | 1.599 | 1.635 | 1.707 | 1.803 | 1.954 | 2.1 | 2.284 |
| 6 | 1.321 | 1.317 | 1.328 | 1.36 | 1.424 | 1.514 | 1.628 | 1.788 | 1.967 | 2.158 |
| 4 | 1.131 | 1.14 | 1.162 | 1.21 | 1.28 | 1.383 | 1.515 | 1.678 | 1.865 | 2.082 |
| 2 | 1.03 | 1.04 | 1.073 | 1.128 | 1.203 | 1.312 | 1.446 | 1.613 | 1.807 | 2.03 |
| 0 | 1 | 1.01 | 1.042 | 1.098 | 1.178 | 1.286 | 1.421 | 1.588 | 1.787 | 2.014 |
| IMAGE HEIGHT | 0 | 2 | 4 | 6 | 8 | 10 | 12 | 14 | 16 | 18 |

FIG. 3B

INTERCHANGEABLE LENS APPARATUS AND IMAGE CAPTURING APPARATUS CAPABLE OF ACQUIRING IN-FOCUS STATE AT DIFFERENT IMAGE HEIGHTS, AND STORAGE MEDIUM STORING FOCUSING PROGRAM

BACKGROUND OF THE INVENTION

Field of the Invention

The present invention relates to an interchangeable lens apparatus and an image capturing apparatus which are used for a lens-interchangeable image capturing system.

Description of the Related Art

In interchangeable lens image capturing systems, in order to ensure compatibility of an interchangeable lens apparatus (hereinafter referred to as "an interchangeable lens") and an image capturing apparatus (hereinafter referred to as "a camera body"), the interchangeable lens stores information on its image capturing optical system and sends the information to the camera body. The information sent from the interchangeable lens to the camera body contains focus sensitivity required to calculate a drive amount of a focus lens included in the image capturing optical system, depending on a defocus amount of the image capturing optical system detected in the camera body by a focus detection function such as a phase difference detection method. The focus sensitivity indicates a relation between a unit movement amount of the focus lens and a displacement amount of an image position (e.g., a ratio between the unit movement amount of the focus lens and the displacement amount of the image position); the image position is a position of an optical image formed by the mage capturing optical system. Dividing the detected defocus amount by the focus sensitivity as the ratio enables acquiring the drive amount of the focus lens required to acquire an in-focus state (see Japanese Patent Laid-Open No. 59-151116).

On the other hand, the camera body is classified into two types; one is a conventional-type camera body that performs focus detection by the phase difference detection method by using a signal acquired from a focus detection sensor independent of an image sensor for acquiring captured images; the other is a new-type camera body that performs the focus detection by using a signal acquired from the image sensor. The conventional-type camera body has a configuration that introduces, to the focus detection sensor, light (optical image) passing through the image capturing optical system and then being reflected by a quick return mirror. For this reason, many conventional-type camera bodies use a small focus detection sensor and thus these camera bodies can detect the defocus amount only in a limited image height range near a central area of an image capturing frame. In contrast, as disclosed in Japanese Patent Laid-Open No. 2010-025997, the new-type camera body is capable of performing the focus detection by using signals acquired from pixels arranged on an overall area of the image sensor. This capability enables detecting the defocus amount not only at low image heights near the central area of the image capturing frame but also at high image heights in a marginal area of the image capturing frame.

However, the inventor has discovered in the focus detection for an identical scene performed by the new-type camera body that there is a significant difference between the defocus amounts at the low image heights and those at the high image heights (which will be described later in detail). When there is such a difference between the defocus amounts at mutually different image heights, driving the focus lens by a drive amount calculated by using the focus sensitivity provided for the low image height with respect to the defocus amount detected at the high image height cannot acquire a good in-focus state at the high image heights.

On the other hand, Japanese Patent Laid-Open No. 59-151116 discloses an autofocus apparatus that reduces a period of time of focusing by setting the focus sensitivity depending on a focal length of a lens.

However, the autofocus apparatus disclosed in Japanese Patent Laid-Open No. 59-151116 is designed without consideration of a variation in the focus sensitivity depending on a position of a focus detection position at which an in-focus state should be obtained. The focus sensitivity assumed for this apparatus is a value corresponding to a center of an image surface, that is, an image height of zero. Applying the focus sensitivity depending on the image height of zero when the focus detection position is located at a position where the image height is not zero may decrease an in-focus accuracy.

SUMMARY OF THE INVENTION

The present invention provides an interchangeable lens apparatus and an image capturing apparatus each capable of acquiring a good in-focus state at any image height when defocus amounts at mutually different image heights are mutually different.

Furthermore, the present invention further provides an image capturing apparatus and an autofocus method each capable of focusing on a marginal area of an image capturing frame with the same accuracy as that in the focusing on other areas in the frame.

The present invention provides as an aspect thereof an interchangeable lens apparatus provided with an image capturing optical system and being detachably attachable to an image capturing apparatus, the image capturing apparatus being configured to detect a defocus amount of the image capturing optical system by using a signal acquired by photoelectric conversion of an optical image formed by the image capturing optical system. The interchangeable lens apparatus includes a focus lens included in the image capturing optical system; and a memory to store information on a focus sensitivity indicating a relation between a unit movement amount of the focus lens and a displacement amount of the optical image. The information on the focus sensitivity is information for enabling acquiring the focus sensitivity different depending on an image height.

The present invention provides as another aspect thereof an image capturing apparatus detachably attachable to an interchangeable lens apparatus provided with an image capturing optical system including a focus lens. The image capturing apparatus includes a defocus detector configured to detect a defocus amount of the image capturing optical system by using a signal acquired by photoelectric conversion of an optical image formed by the image capturing optical system, a sensitivity acquirer configured to acquire a focus sensitivity indicating a relation between a unit movement amount of the focus lens and a displacement amount of the optical image, the focus sensitivity corresponding to an image height at which the defocus amount is detected, and a drive amount calculator configured to calculate a drive amount of the focus lens by using the focus sensitivity corresponding to the image height and the defocus amount.

The present invention provides as yet another aspect thereof an image capturing apparatus provided with an image capturing optical system including a focus lens. The image capturing apparatus includes a defocus detector configured to detect a defocus amount of the image capturing optical system by using a signal acquired by photoelectric conversion of an optical image formed by the image capturing optical system, a sensitivity acquirer configured to acquire a focus sensitivity indicating a relation between a unit movement amount of the focus lens and a displacement amount of the optical image, the focus sensitivity corresponding to an image height at which the defocus amount is detected, and a drive amount calculator configured to calculate a drive amount of the focus lens by using the focus sensitivity corresponding to the image height and the defocus amount.

The present invention provides as still another aspect thereof an image capturing apparatus detachably attachable to an interchangeable lens apparatus provided with an image capturing optical system including a focus lens. The image capturing apparatus includes a defocus detector configured to detect a defocus amount of the image capturing optical system by using a signal acquired by photoelectric conversion of an optical image formed by the image capturing optical system, and an image height sender configured to send information on an image height at which the defocus amount is detected to the interchangeable lens apparatus, the interchangeable lens apparatus storing information on the focus sensitivity indicating a relation between a unit movement amount of the focus lens and a displacement amount of the optical image, the information on the focus sensitivity being information for enabling acquiring the focus sensitivity different depending on the image height.

The present invention provides as yet still another aspect thereof a computer program configured to cause a computer in an interchangeable lens apparatus to perform a focus process, the interchangeable lens apparatus being provided with an image capturing optical system including a focus lens, being detachably attachable to an image capturing apparatus configured to detect a defocus amount of the image capturing optical system by using a signal acquired by photoelectric conversion of an optical image formed by the image capturing optical system and storing information on a focus sensitivity indicating a relation between a unit movement amount of the focus lens and a displacement amount of the optical image, the information on the focus sensitivity being information for enabling acquiring the focus sensitivity different depending on an image height. The focus process includes any one of the following processes: a process to send the information on the focus sensitivity to the image capturing apparatus configured to calculate a drive amount of the focus lens by using the focus sensitivity depending on the image height and the defocus amount; a process to receive, from the image capturing apparatus, information on the image height at which the defocus amount is detected, to acquire the focus sensitivity at the received image height by using the information on the focus sensitivity and to send the acquired focus sensitivity to the image capturing apparatus configured to calculate the drive amount of the focus lens by using the focus sensitivity and the defocus amount; and a process to receive, from the image capturing apparatus, information on the image height at which the defocus amount is detected, to acquire the focus sensitivity at the received image height by using the information on the focus sensitivity and to calculate the drive amount of the focus lens by using the acquired focus sensitivity and the defocus amount received from the image capturing apparatus.

The present invention provides as further another aspect thereof a computer program configured to cause a computer in an image capturing apparatus to perform a focus process, the image capturing apparatus being detachably attachable to an interchangeable lens apparatus provided with an image capturing optical system including a focus lens and being configured to detect a defocus amount of the image capturing optical system by using a signal acquired by photoelectric conversion of an optical image formed by the image capturing optical system. The focus process includes acquiring focus sensitivity indicating a relation between a unit movement amount of the focus lens and a displacement amount of the optical image, the focus sensitivity corresponding to an image height at which the defocus amount is detected, and calculating a drive amount of the focus lens by using the focus sensitivity corresponding to the image height and the defocus amount.

The present invention provides as yet further another aspect thereof a computer program configured to cause a computer in an image capturing apparatus to perform a focus process, the image capturing apparatus provided with an image capturing optical system including a focus lens and being configured to detect a defocus amount of the image capturing optical system by using a signal acquired by photoelectric conversion of an optical image formed by the image capturing optical system. The focus process includes acquiring focus sensitivity indicating a relation between a unit movement amount of the focus lens and a displacement amount of the optical image, the focus sensitivity corresponding to an image height at which the defocus amount is detected, and calculating a drive amount of the focus lens by using the focus sensitivity corresponding to the image height and the defocus amount.

The present invention provides as still further another aspect thereof a computer program configured to cause a computer in an image capturing apparatus to perform a focus process, the image capturing apparatus being detachably attachable to an interchangeable lens apparatus provided with an image capturing optical system including a focus lens and being configured to detect a defocus amount of the image capturing optical system by using a signal acquired by photoelectric conversion of an optical image formed by the image capturing optical system. The focus process includes acquiring an image height at which the defocus amount is detected, and sending information on the image height to the interchangeable lens apparatus that stores information on the focus sensitivity, the focus sensitivity indicating a relation between a unit movement amount of the focus lens and a displacement amount of the optical image, the information on the focus sensitivity being information for enabling acquiring the focus sensitivity different depending on the image height.

The present invention provides as yet still further another aspect thereof an image capturing apparatus configured to perform focusing by moving a focus lens included in an image capturing optical system in an optical axis direction of the image capturing optical system. The image capturing apparatus includes a focus detector configured to detect a focus state of the image capturing optical system at a focus detection position, and a controller configured to correct focus sensitivity depending on a position of the focus detection position and a focal length of the image capturing optical system, the focus sensitivity being a focal displacement amount with respect to a movement amount of the focus lens in the optical axis direction and to calculate a drive amount and a drive direction of the focus lens depending on information on the focus state detected by the focus detector and on information on the corrected focus sensitivity.

The present invention provides as further another aspect thereof a computer program configured to cause a computer in an image capturing apparatus to perform a focus process for focusing by moving a focus lens included in an image capturing optical system in an optical axis direction of the image capturing optical system. The focus process includes correcting focus sensitivity depending on a position of a focus detection position and a focal length of the image capturing optical system, the focus sensitivity being a focal displacement amount with respect to a movement amount of the focus lens in the optical axis direction, and calculating a drive amount and a drive direction of the focus lens depending on a focus state of the image capturing optical system and information on the corrected focus sensitivity.

Further features and aspects of the present invention will become apparent from the following description of exemplary embodiments with reference to the attached drawings.

BRIEF DESCRIPTION OF THE DRAWINGS

FIG. 3A illustrates a ratio of a defocus amount detected in a central area of an image capturing frame to that detected in a marginal area thereof in a vertical-line detection performed by a wide angle lens that is a numerical example of the present invention.

FIG. 3B illustrates a ratio of a defocus amount detected in a central area of an image capturing frame to that detected in a marginal area thereof in a vertical-line detection performed by a wide angle lens that is a numerical example of the present invention.

DESCRIPTION OF THE EMBODIMENTS

Exemplary embodiments of the present invention will be described below with reference to the attached drawings.

First of all, description will be made of the above-described defocus amount difference between the mutually different image heights. Here, description will be made assuming a case where the above-described new-type camera is capable of detecting the defocus amount of the image capturing optical system in the entire image capturing frame (that is, from the central area to the marginal area of the image capturing frame) by using the signal acquired from the image sensor for providing captured images.

On an entire imaging surface of the image sensor, multiple paired focus detection pixels are arranged which receive light fluxes from horizontally or vertically divided pupil areas in an exit pupil of the image capturing optical system (that is, perform pupil division) to photoelectrically convert paired optical images formed by the light fluxes from the divided pupil areas. Each focus detection pixel is provided with a microlens and a light-shielding layer that forms an aperture shifted from a center of the pixel, which enables the pupil division.

However, as the image sensor, a so-called dual-pixel image sensor may alternatively be used in which all of pixels on its imaging surface are each constituted by paired light receiving elements capable of photoelectrically converting paired optical images formed by a microlens provided with the pixel.

Moreover, the following description can be applied not only to embodiments described later, but also to conventional-type cameras capable of detecting the defocus amount in the entire or most part of the image capturing frame.

Figure 1:
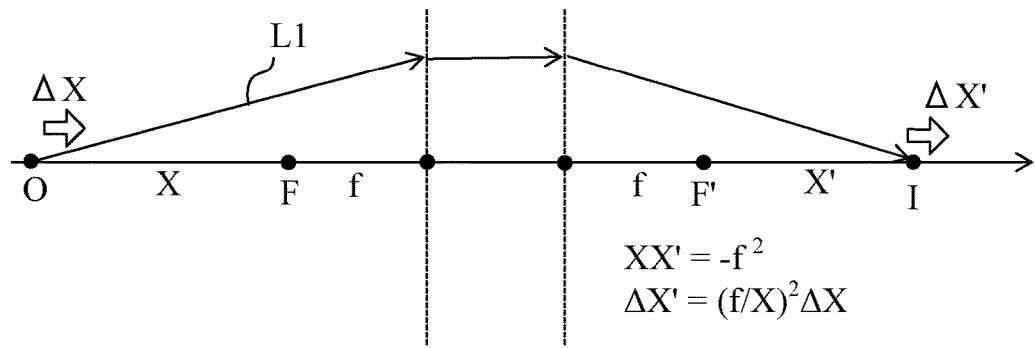
FIG. 1 illustrates a Newton formula for an axial principal ray.

FIG. 1 illustrates an imaging state of a typical image capturing optical system in which an axial principal ray L1 exiting from an axial object point O that is an object point on an optical axis of the image capturing optical system reaches an axial image point I that is an image point on the optical axis. In FIG. 1, F represents a front focal point of the image capturing optical system, and F' represents a rear focal point. Furthermore, f represents a focal length of the image capturing optical system. When X represents a distance from the front focal point F to the object point O, and X' represents a distance from the rear focal point F' to the axial image point I, a relation expressed by expression (1) holds according to a Newton formula:

$$XX' = -f^2. \quad (1)$$

When the axial object point O in the state illustrated in FIG. 1 moves by a distance $\Delta X$ in a direction along the optical axis (hereinafter referred to as "an optical axis direction"), the axial image point I accordingly moves by a distance $\Delta X'$ in the optical axis direction. Also in this case, a relation expressed by expression (2) holds according to the Newton formula.

$$(X+\Delta X)(X'+\Delta X') = -f^2. \quad (2)$$

When $\Delta X$ in expression (2) is minute ($\rightarrow 0$), $\Delta X'$ is expressed as:

$$\Delta X' = (f/X)^2 \Delta X. \quad (3)$$

Figure 2:
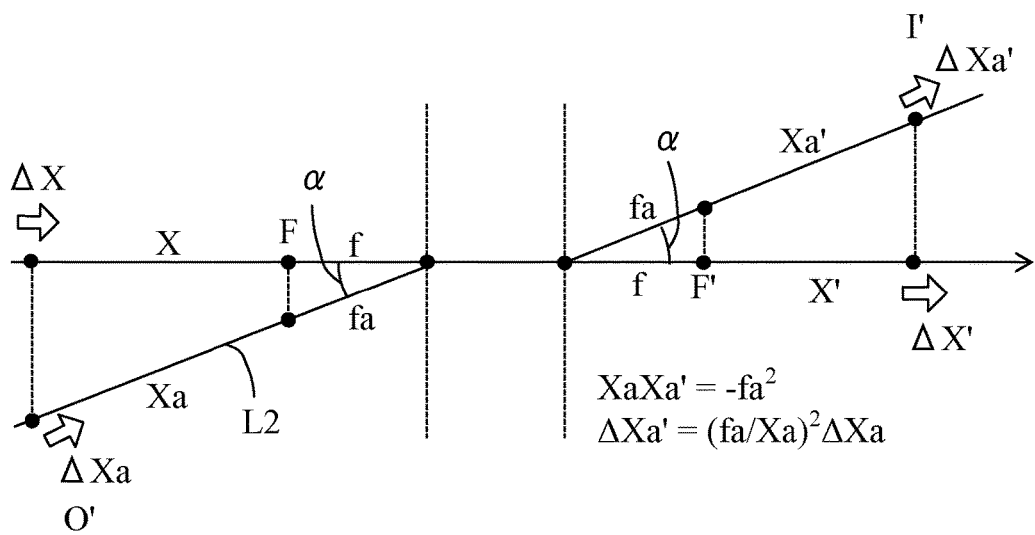
FIG. 2 illustrates a Newton formula on an off-axis principal ray.

On the other hand, FIG. 2 illustrates a state of the image capturing optical system illustrated in FIG. 1 in which an off-axis principal ray L2 exiting from an off-axis object point O' that is an object point distant from the optical axis reaches an off-axis image point I' that is an image point distant from the optical axis. In FIG. 2, α represents an angle formed by the off-axis principal ray L2 with respect to the optical axis. A distance in the optical axis direction to the off-axis object point O' from the front focal point F and that to the off-axis image point I' from the rear focal point F' are respectively equal to the distances X to the axial object point O from the front focal point F and the distance X' to the axial image point I from the rear focal point F'.

When the off-axis object point O' in the state illustrated in FIG. 2 moves by the distance ΔX in the optical axis direction, the off-axis image point I' accordingly moves by the distance ΔX' in the optical axis direction. Also in this case, expression (4) holds according to the Newton formula. Furthermore, when ΔX is minute, a relation expressed by expression (5) holds:

$$XaXa' = -fa^2 \quad (4)$$

$$\Delta Xa' = (fa/Xa)^2 \Delta Xa \quad (5)$$

Where ΔXa=ΔX/cos α, ΔXa'=ΔX'/cos α, fa=f/cos α, and Xa=X/cos α.

Therefore, the above-described expression (3) holds. This means that the movement of the object point by ΔX results in the movement of the image point by ΔX' in the optical axis direction.

This relation, however, holds only when the angle α formed by the off-axis principal ray L2 with respect to the optical axis is equal on both an object side and an image side. Since, in typical image capturing optical systems, an oblique entrance of a ray into a light-receiving surface of an image sensor provided to an image capturing apparatus results in darkening due to vignetting called shading and in coloring, the image capturing optical systems are designed such that the angle α on the image side is as small as possible. However, a so-called wide angle lens has a larger angle α on the object side, which means that the angle α on the object side and that on the image side are significantly different from each other.

Assuming that the angle α on the image side is 0 degree, a relation of Xa'=X' is satisfied, the Newton formula is expressed by expression (6), and expression (7) holds:

$$XX' = -f^2/\cos\alpha \quad (6)$$

$$(X+\Delta Xb)(X'+\Delta Xb') = -fa^2/\cos\alpha \quad (7)$$

Where ΔXb=ΔX/cos α, and ΔXb'=ΔX'/cos α.
When ΔX is minute (→0) in expression (7), ΔXb' is expressed as:

$$\Delta Xb' = (f/X)^2 \Delta Xb/\cos\alpha \quad (8)$$

Therefore, expression (9) holds:

$$\Delta X' = (f/X)^2 \Delta X/\cos^2\alpha \quad (9)$$

This means that movement of an object surface including the axial object point O and the off-axis object point O' results in a difference between the defocus amounts respectively generated in the central area and the marginal area of the image capturing frame. Moreover, although, in theory, a ratio between the defocus amounts in the central area and the marginal area can be expressed by a general expression like expression (9), the ratio varies depending not only on a field angle on the object side and an angle of the off-axis principal ray on the image side, but also on residual aberration. Because of this fact, the ratio often cannot be sufficiently expressed by the general expression.

FIGS. 3A and 3B illustrate, for a wide angle lens as a numerical example having numeral values shown in Table 1, ratios of defocus amounts at respective image heights to a defocus amount(=1) at a center (image height=0) of an image capturing frame. This wide angle lens has a focal length of 11 mm. FIG. 3A illustrates the ratios in the vertical-line detection in which the defocus amounts are detected by the pupil division in the vertical direction. FIG. 3B illustrates the ratios in the horizontal-line detection in which the defocus amounts are detected by the pupil division is performed in the horizontal direction. As can be understood from FIGS. 3A and 3B, the wide angle lens of this numerical example has a larger defocus amount in a more marginal area than the defocus amount at the center, which becomes several times as large as the defocus amount at the center.

For this reason, calculating the drive amounts of the focus lens by using an identical focus sensitivity (i.e., a displacement amount of an image position with respect to a unit movement amount of the focus lens) in the central area and the marginal area makes it impossible to acquire a good in-focus state at either of the central area or the marginal area. For instance, calculating the drive amount of the focus lens from the defocus amount detected in the marginal area by using the focus sensitivity corresponding to the central area makes it impossible to acquire a good in-focus state in the marginal area. Consequently, an in-focus accuracy in the marginal area decreases, which requires driving the focus lens again and thereby requires a longer period of time to acquire an in-focus state. In order to overcome this problem, each of embodiments described later enables, when defocus amounts are different depending on the image height, acquiring a good in-focus state, that is, performing good autofocus at any image height.

[Embodiment 1]

Figure 4:
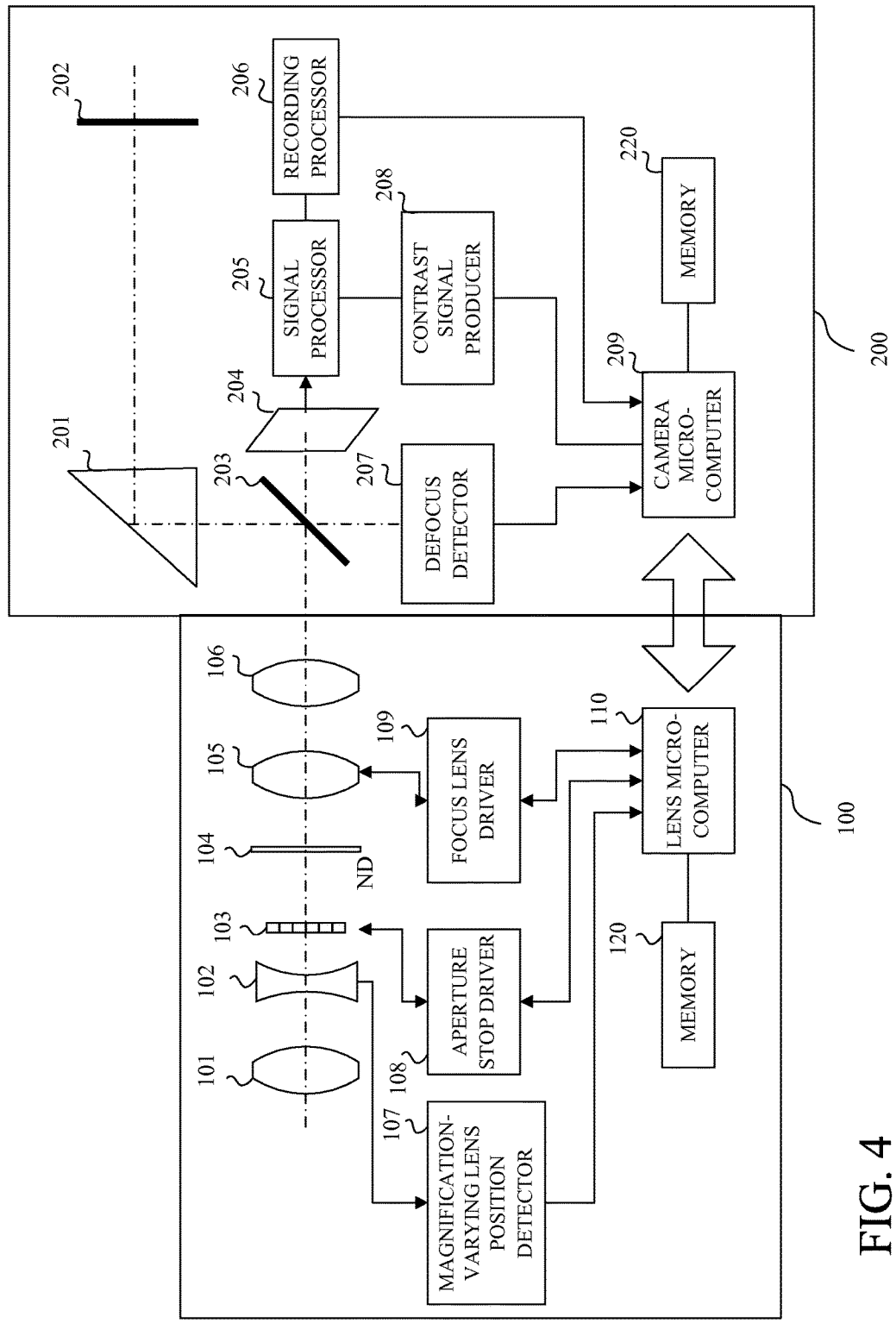
FIG. 4 illustrates a configuration of an image capturing system that is Embodiment 1 of the present invention.

FIG. 4 illustrates a configuration of a lens-interchangeable image capturing system that is a first embodiment (Embodiment 1) of the present invention. The image capturing system is constituted by an interchangeable lens apparatus (hereinafter simply referred to as "an interchangeable lens") 100 corresponding to a wide angle lens of the above-described numerical example and a camera body (image capturing apparatus) 200 to which the interchangeable lens 100 is detachably attached.

The interchangeable lens 100 includes an image capturing optical system, a magnification-varying lens position detector 107, an aperture stop driver 108, a focus lens driver 109, a lens microcomputer 110 and a memory 120.

The image capturing optical system is constituted by, in order from an object side, a first lens 101, a magnification-varying lens 102 as a second lens, an aperture stop 103, an ND filter 104, a focus lens 105 as a third lens and a fourth lens 106.

In response to an operation of a manual zoom operation portion (not illustrated) by a user, the magnification-varying lens 102 is moved in an optical axis direction in which an optical axis OA extends to vary a focal length (that is, to perform variation of magnification). The magnification-varying lens position detector 107 detects a position of the magnification-varying lens 102 (hereinafter referred to also as "a zoom position") by using, for example, a variable resistance. The magnification-varying lens position detector 107 outputs data on the zoom position to the lens microcomputer 110.

The aperture stop 103 is driven via the aperture stop driver 108 controlled by the lens microcomputer 110 to move multiple stop blades (not illustrated) in an open-and-close direction, thereby controlling an amount of light passing through a stop aperture formed by the stop blades. The aperture stop driver 108 includes a stepping motor, a voice coil motor (VCM) or the like as an actuator and detects positions of the stop blades (aperture values) by using a hall element.

In response to an operation of an ND filter operation portion (not illustrated) by the user, the ND filter 104 is inserted into and retracted from an optical path of the image capturing optical system. The ND filter 104 is inserted into the optical path to attenuate the amount of the light passing through the stop aperture. This function prevents so-called small aperture diffraction generated when the stop aperture becomes small. Whether or not the ND filter 104 is being inserted into the optical path is detected by an ND detector (not illustrated) constituted by a photointerrupter. A result of the detection is output to the lens microcomputer 110.

The focus lens 105 is moved (driven) in the optical axis direction by the focus lens driver 109 controlled by the lens microcomputer 110 to perform focusing. The focus lens driver 109 includes the stepping motor or the like as a focus actuator. The lens microcomputer 110 counts number of pulses of a drive pulse signal (hereinafter referred to as "a focus drive pulse") given to the focus actuator in the focus lens driver 109 to acquire a drive amount and a drive position from a reference position of the focus lens 105. A DC motor or a VCM may alternatively be used as the focus actuator with a position sensor that detects the position of the focus lens 105.

The lens microcomputer 110 communicates with a camera microcomputer 209 included in the camera body 200 and controls all components of the interchangeable lens 100 depending on drive commands received from the camera microcomputer 209. The memory 120 stores various kinds of information and a computer program both required to operate the lens microcomputer 110. The lens microcomputer 110 serves also as a sensitivity sender and a flag sender.

The camera body 200 includes a pentaprism 201, an optical viewfinder 202, a quick return mirror (hereinafter simply referred to as "a mirror") 203 and an image sensor 204. The camera body 200 further includes a signal processor 205, a recording processor 206, a defocus detector 207, a contrast signal producer 208, a camera microcomputer 209 and a memory 220.

The mirror 203 is inserted into and retracted from the optical path of the image capturing optical system of the interchangeable lens 100. The mirror 203 inserted into the optical path reflects the light (optical image) passing through the image capturing optical system to introduce the light via the pentaprism 201 to the optical viewfinder 202. This viewfinder system allows the user to observe the optical image of the object through the optical viewfinder 202. In addition, as a result of the retraction of the mirror 203 to outside of the optical path by a driving mechanism (not illustrated), the light passing through the image capturing optical system forms the optical image on the image sensor 204.

The image sensor 204 is constituted by a photoelectric conversion element such as a CMOS sensor and photoelectrically converts the optical image to output an analog signal. On the image sensor 204, a large number of pixels are arranged, some of which are discretely arranged as paired focus detection pixels that perform the above-described pupil division to photoelectrically convert the paired optical images. The pixels other than the focus detection pixels are image capturing pixels outputting pixel signals to be used to produce the captured image. As described above, as the image sensor 204, the dual-pixel image sensor may alternatively be used.

The defocus detector 207 produces paired focus detection signals corresponding to the paired optical images by using analog signals output from the focus detection pixels and performs a correlation calculation on the paired focus detection signals to calculate a phase difference therebetween. Thereafter, the defocus detector 207 calculates (detects) a defocus amount of the image capturing optical system from the phase difference. The defocus amount is output to the camera microcomputer 209 and used for autofocus (AF) by a phase difference detection method.

The signal processor 205 converts the analog signal output from the image sensor 204 into a digital signal and performs, on the digital signal, various image processes such as gain control, color correction and white balance control to produce an image signal. The recording processor 206 records, in a recording medium, the image signal produced by the signal processor 205 and displays the image signal on a display (not illustrated).

The contrast signal producer 208 extracts, by using a high-pass filter, a predetermined high-frequency component from the image signal produced by the signal processor 205 to produce a contrast evaluation signal by using one or multiple high-frequency component signal integrated values acquired by integrating the high-frequency component. The contrast evaluation signal is output to the camera microcomputer 209 and used for AF by a contrast detection method.

The camera microcomputer 209 communicates with the lens microcomputer 110 at a predetermined period or as needed to send commands such as an aperture stop drive command and a focus drive command to the lens microcomputer 110. The camera microcomputer 209 further receives various kinds of information from the lens microcomputer 110. The memory 220 stores various kinds of information and a computer program both required to operate the camera microcomputer 209 and the lens microcomputer 11. The camera microcomputer 209 serves also as a sensitivity acquirer and a drive amount calculator.

Next, description will be made of the focus sensitivity. The focus sensitivity is, as described above, an index indicating the relation between the unit movement amount of the focus lens 105 and the displacement amount of the image position that is a position of the optical image formed by the mage capturing optical system. The focus sensitivity S in this embodiment indicates a ratio of the unit movement amount of the focus lens 105 to the displacement amount of the image position. For instance, when the focus lens 105 is moved by a unit movement amount of 1 mm, a displacement amount of 1 mm of the image position provides a focus sensitivity S of 1, and a displacement amount of 2 mm of the image position provides a focus sensitivity S of 2. However, as the focus sensitivity, an alternative value such as an inverse of the ratio may be used.

The focus sensitivity may be defined also as a movement amount of an image plane with respect to a specific unit amount in a case where the focus lens is moved depending on a monotonically increasing function. For example, when the focus lens is driven by a cam groove portion provided in a cam ring rotated, the focus sensitivity may be regarded as a displacement amount of the image position with respect to a unit angle of the rotation of the cam ring.

When d represents the defocus amount detected by the defocus detector 207, and S represents the focus sensitivity as the ratio, the drive amount X of the focus lens 105 is typically acquired by using expression (10):

$$X = d/S. \quad (10)$$

On the other hand, the number of pulses P of the focus drive pulse supplied by the focus lens driver 109 to the focus actuator is acquired by using expression (11), with m representing a movement amount of the focus lens 105 per the focus drive pulse:

$$P = X/m = d/(mS). \quad (11)$$

The defocus detector 207, the camera microcomputer 209 and the lens microcomputer 110 perform the AF by the phase difference detection method. The camera microcomputer 209 previously acquires, from the lens microcomputer 110, a current position of the focus lens 105, the focus sensitivity S and the movement amount m of the focus lens 105 per focus drive pulse. As described above, the defocus detector 207 calculates the phase difference between the paired focus detection signals acquired from the image sensor 204 and calculates (detects) the defocus amount from the phase difference. The camera microcomputer 209 calculates the number of pulses P of the focus drive pulse by using expression (11) and sends the focus drive command containing the number of pulses P to the lens microcomputer 110. The lens microcomputer 110 controls the focus lens driver 109 so as to supply, to the focus actuator, the focus drive pulse whose number corresponds to the received number of pulses P. This control moves the focus lens 105 by the drive amount X(=d/S), which causes the image capturing optical system to be in an in-focus state.

However, as described with reference to FIGS. 3A and 3B, the interchangeable lens 100 of this embodiment includes the image capturing optical system whose defocus amount d(h) varies depending on the image height h. For this reason, in this embodiment, the camera microcomputer 209 calculates the drive amount X of the focus lens 105 by using the focus sensitivity S(h) corresponding to the image height h at which the defocus amount d(h) is detected. That is, the camera microcomputer 209 acquires the drive amount X of the focus lens 105 by using expression (12). Furthermore, the camera microcomputer 209 acquires the number of pulses P of the focus drive pulse by using expression (13).

$$X = d(h)/S(h) \quad (12)$$

$$P = X/m = d(h)/(mS(h)) \quad (13)$$

Figure 5:
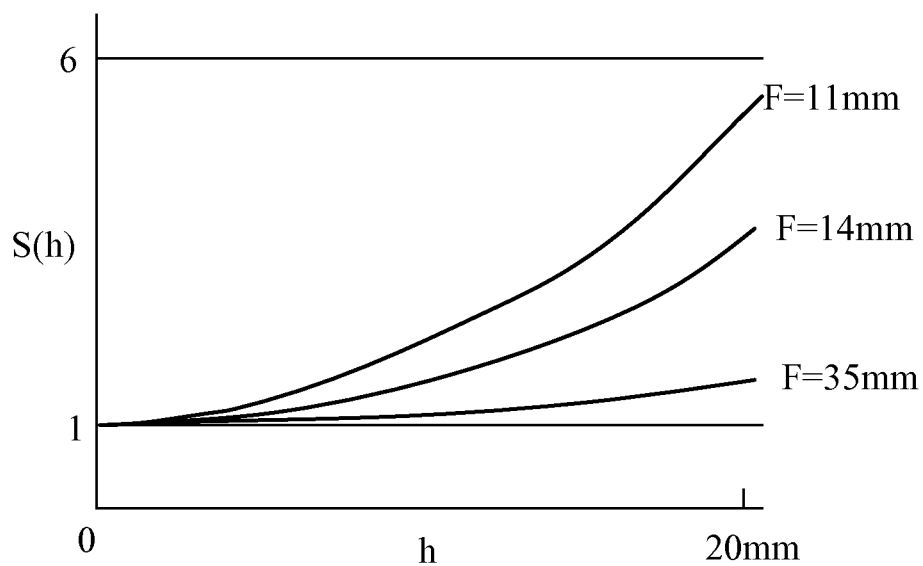
FIG. 5 illustrates a relation between an image height h and a focus sensitivity S(h) in Embodiment 1.

FIG. 5 illustrates a relation between the image height h and the focus sensitivity S(h) of each of interchangeable lenses (image capturing optical systems) whose focal lengths f are 11 mm, 14 mm and 35 mm, respectively. This drawing illustrates the focus sensitivities of the respective interchangeable lenses at respective image heights in a case where the focus sensitivity at a center image height (0 mm) is 1. A maximum image height is 20 mm as an example.

The interchangeable lens whose focal length f is 35 mm has a focus sensitivity that does not largely vary in a range from the center image height to the maximum image height. Use of such an interchangeable lens enables acquiring a substantially good in-focus state even when the drive amount of the focus lens is calculated by applying the focus sensitivity at the center image height to the defocus amount detected at the maximum image height. In contrast, the wide-angle interchangeable lenses whose focal lengths f are 11 mm (corresponding to the above numerical example) and 14 mm, respectively, have focus sensitivities that considerably largely vary in the range from the center image height to the maximum image height. Use of such wide-angle interchangeable lenses requires calculating the drive amount of the focus lens by applying the focus sensitivity corresponding to the image height at which the defocus amount is detected (hereinafter referred to as "a defocus detection image height") to acquire a good in-focus state For this reason, in this embodiment, in order to allow the camera microcomputer 209 to acquire the focus sensitivity corresponding to the defocus detection image height, the memory 120 in the interchangeable lens 100 stores information on the focus sensitivity different depending on the image height.

The information on the focus sensitivity contains not only the focus sensitivity itself corresponding to the defocus detection image height, but also a function that enables calculating the focus sensitivity corresponding to the defocus detection image height (the function is hereinafter referred to as "a focus sensitivity function"). The information on the focus sensitivity further contains one or more coefficients used in the focus sensitivity function (the one or more coefficients are hereinafter collectively referred to as "a focus sensitivity coefficient"). The focus sensitivity function and the focus sensitivity coefficient will be described later in detail. Moreover, the information on the focus sensitivity contains a table containing data on the focus sensitivity at each image height (the table is hereinafter referred to as "a focus sensitivity table").

The camera microcomputer 209 receives the information on the focus sensitivity from the lens microcomputer 110 to acquire the focus sensitivity corresponding to the defocus detection image height. For instance, the camera microcomputer 209 receives the focus sensitivity function from the lens microcomputer 110 and stores the function to calculate the focus sensitivity corresponding to the defocus detection image height by substituting the defocus detection image height into the focus sensitivity function. This method of acquiring the focus sensitivity corresponding to the defocus detection image height is hereinafter referred to as "method 1".

Alternatively, when the camera microcomputer 209 prestores part of the focus sensitivity function other than the focus sensitivity coefficient, the camera microcomputer 209 receives the focus sensitivity coefficient from the lens microcomputer 110 to create the focus sensitivity function. In this case, the camera microcomputer 209 may calculate the focus sensitivity corresponding to the defocus detection image height by substituting the defocus detection image height into the created focus sensitivity function. This method of acquiring the focus sensitivity corresponding to the defocus detection image height is hereinafter referred to as "method 2".

Furthermore, when the camera microcomputer 209 sends the defocus detection image height (i.e., information on the image height) to the lens microcomputer 110, the lens microcomputer 110 may read out the focus sensitivity corresponding to the defocus detection image height from the focus sensitivity table stored in the memory 120 to send the focus sensitivity to the camera microcomputer 209. This method of acquiring the focus sensitivity corresponding to the defocus detection image height is hereinafter referred to as "method 3". Moreover, the camera microcomputer 209 may receive the focus sensitivity table from the lens microcomputer 110 and store the table and read out, from the table, the focus sensitivity corresponding to the defocus detection image height. This method of acquiring the focus sensitivity corresponding to the defocus detection image height is hereinafter referred to as "method 4".

The focus sensitivity functions $S^H(x,y)$ and $S^V(x,y)$ in the numerical example are expressed by expressions (14) and (15). In these expression, $S^H(x,y)$ represents the focus sensitivity function in a horizontal direction (corresponding to a direction of the horizontal-line detection), and $S^V(x,y)$ represents a focus sensitivity function in a vertical direction (corresponding to a direction of the vertical-line detection). Furthermore, S represents in the right side of each of expressions (14) and (15) represents a central focus sensitivity, and $(a_{00}^H + a_{20}^H x^2 + a_{02}^H y^2 + a_{22}^H x^2 y^2)$ and $(a_{00}^V + a_{20}^V x^2 + a_{02}^V y^2 + a_{22}^V x^2 y^2)$ each multiplied by S are polynomials used to calculate the focus sensitivity corresponding to the image height. Moreover, x represents the image height in the horizontal direction, y represents the image height in the vertical direction, and $a_{00}^H, a_{02}^H, a_{20}^H, a_{22}^H, a_{00}^V, a_{02}^V, a_{20}^V$ and $a_{22}^V$ each represent the focus sensitivity coefficient ("e−n" means "×10$^{-n}$"). Substituting the defocus detection image heights x and y into the polynomials enables acquiring the focus sensitivity corresponding to the defocus detection image height.

$$S^H(x, y) = S(a_{00}^H + a_{20}^H x^2 + a_{02}^H y^2 + a_{22}^H x^2 y^2) \quad (14)$$

$$S^V(x, y) = S(a_{00}^V + a_{20}^V x^2 + a_{02}^V y^2 + a_{22}^V x^2 y^2) \quad (15)$$

$$a_{00}^H = a_{00}^V = 1$$

$$a_{20}^V = a_{02}^H = 1.01e-2$$

$$a_{02}^V = a_{20}^H = 3.35e-3$$

$$a_{22}^V = a_{22}^H = -2.94e-5$$

The above-mentioned large variation in the focus sensitivity depending on the image height can be found mainly in wide angle lenses. For this reason, when a telephoto lens or the like whose focus sensitivity slightly varies depending on the image height is used, it is unnecessary to perform a process of sending and receiving the information on the focus sensitivity corresponding to the image height between the lens microcomputer 110 and the camera microcomputer 209. Therefore, it is desirable that the camera microcomputer 209 determine whether or not the interchangeable lens 100 attached thereto stores the information on the focus sensitivity corresponding to the image height. When determining that the interchangeable lens 100 does not store the information on the focus sensitivity corresponding to the image height, the camera microcomputer 209 receives, from the lens microcomputer 110, only information on the focus sensitivity corresponding to the central area of the image capturing frame, as in conventional image capturing apparatuses. The camera microcomputer 209 then calculates the drive amount of the focus lens 105 by using the focus sensitivity corresponding to the central area. On the other hand, when determining that the interchangeable lens 100 stores the information on the focus sensitivity corresponding to the image height, the camera microcomputer 209 receives the information from the lens microcomputer 110 and acquires the focus sensitivity corresponding to the defocus detection image height. The camera microcomputer 209 then calculates the drive amount of the focus lens 105 by using the focus sensitivity corresponding to the defocus detection image height.

Moreover, the focus sensitivity corresponding to the image height may be different depending on an azimuth direction (i.e., an angle formed by a vector extending from the center in a radial direction). The azimuth direction includes a sagittal direction and a meridional direction orthogonal to each other and further includes directions other than the sagittal and meridional directions. FIG. 2 described above illustrates an off-axis principal ray on a plane (meridional section) including a direction of the image height and the optical axis. On a plane (sagittal section) orthogonal to the meridional plane, an angle formed by the off-axis principal ray with respect to the optical axis is 0 degree. For this reason, the defocus amount is different depending on the azimuth direction. Thus, it is desirable that the focus sensitivity be different depending not only on the image height, but also on the azimuth direction.

FIGS. 3A and 3B respectively illustrate, as described above, the focus sensitivities in the vertical-line detection and the horizontal-line detection. In the drawings, a sagittal component and a meridional component are mixed with each other in each of the vertical-line direction and the horizontal-line direction in a ratio different depending on positions. This means that the focus sensitivity varies depending on the azimuth direction.

Figure 6:
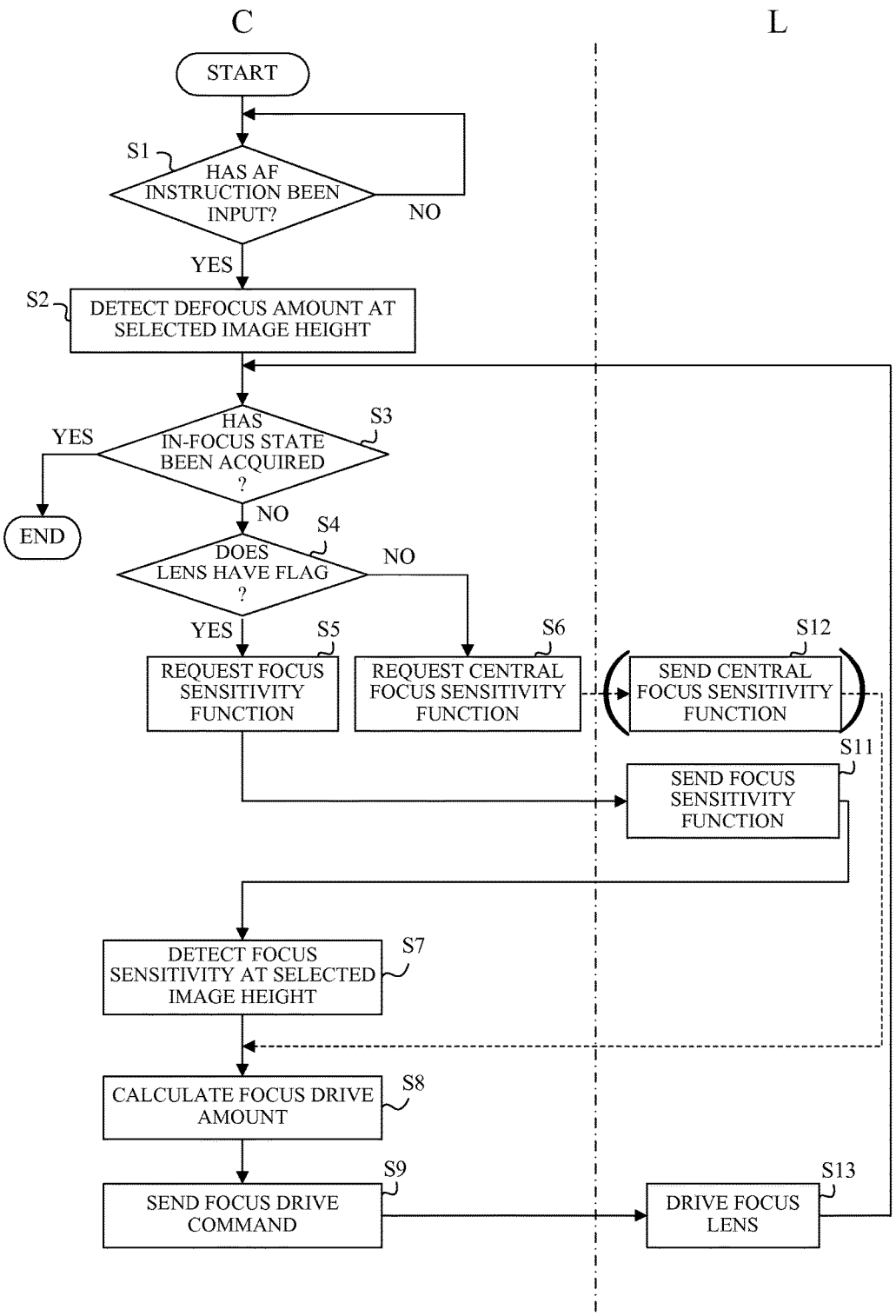
FIG. 6 is a flowchart illustrating an AF process in the image capturing system of Embodiment 1 of the present invention.

Next, with reference to a flowchart of FIG. 6, description will be made of an AF process by method 1 (or method 2) executed by the camera microcomputer 209 and the lens microcomputer 110. The camera microcomputer 209 and the lens microcomputer 110 execute this AF process according to computer programs installed therein. In FIG. 6, C represents processes executed by the camera microcomputer 209, and L represents processes executed by the lens microcomputer 110. A non-transitory computer-readable storage medium storing each of the programs constitutes an alternative embodiment of the present invention.

At step (abbreviated as "S" in the drawing) 1, upon receipt of an AF instruction through a half-press operation of a release switch (not illustrated) by the user, the camera microcomputer 209 proceeds to step 2.

At step 2, the camera microcomputer 209 causes the defocus detector 207 to detect a defocus amount in a focus detection area (focus detection position) that is a partial area of the image capturing frame selected by the user or a predetermined algorithm, that is, at a selected image height (that is, the defocus detection image height).

Next, at step 3, the camera microcomputer 209 determines whether or not the defocus amount detected at step 2 is within a predetermined in-focus range, that is, whether or not an in-focus state has been acquired. The camera microcomputer 209 ends the AF process when determining that the in-focus state has been acquired and proceeds to step 4 when determining that the in-focus state has not been acquired.

At step 4, the camera microcomputer 209 determines whether or not the interchangeable lens attached to the camera body 200 stores the information on the focus sensitivity corresponding to the image height. In this embodiment, in an initial communication with the camera microcomputer 209, the lens microcomputer 110 sends, to the camera microcomputer 209, flag information indicating that it stores the information on the focus sensitivity corresponding to the image height. The camera microcomputer 209 performs the above-described determination depending on whether or not the flag information is received. When the camera microcomputer 209 receives, in the initial communication with the lens microcomputer 110, identification information (ID information) such as a model name of the interchangeable lens 100 from the lens microcomputer 110, the camera microcomputer 209 may perform the determination at this step by using the ID information as the flag information.

When an interchangeable lens having the flag information, that is, the interchangeable lens of this embodiment (hereinafter referred to as "a first interchangeable lens") 100 is attached to the camera body 200, the camera microcomputer 209 proceeds to step 5. On the other hand, when an interchangeable lens not having the flag information (not illustrated in the drawing; hereinafter referred to as "a second interchangeable lens") is attached to the camera body 200, the camera microcomputer 209 proceeds to step 6. In FIG. 6, a process (step 12) executed by a lens microcomputer of the second interchangeable lens and transition to and from the process are parenthesized and shown by dotted arrows, respectively.

At step 5, the camera microcomputer 209 requests the lens microcomputer 110 of the first interchangeable lens 100 to send the focus sensitivity function. At step 11, the lens microcomputer 110 sends the focus sensitivity function stored in the memory 120 to the camera microcomputer 209.

When, as in method 2, the camera microcomputer 209 stores the part of the focus sensitivity function other than the focus sensitivity coefficient and the memory 120 of the first interchangeable lens 100 stores the focus sensitivity coefficient, the process is executed as follows. First, at step 5, the camera microcomputer 209 requests the lens microcomputer 110 to send the focus sensitivity coefficient. At step 11, the lens microcomputer 110 sends the focus sensitivity coefficient to the camera microcomputer 209. The camera microcomputer 209 creates the focus sensitivity function by using the received focus sensitivity coefficient and then proceeds to step 7.

On the other hand, at step 6, the camera microcomputer 209 requires the lens microcomputer of the second interchangeable lens to send the central focus sensitivity. The central focus sensitivity is the focus sensitivity corresponding to the central area of the image capturing frame. At step 12, the lens microcomputer of the second interchangeable lens sends the central focus sensitivity stored in a memory included in the second interchangeable lens to the camera microcomputer 209. In this case, the camera microcomputer 209 proceeds to step 8.

At step 7, the camera microcomputer 209 substitutes the defocus detection image height into the focus sensitivity function received from the lens microcomputer 110 or into the focus sensitivity function created by using the focus sensitivity coefficient received from the lens microcomputer 110. The camera microcomputer 209 thereby calculates the focus sensitivity corresponding to the defocus detection image height.

Subsequently, at step 8, the camera microcomputer 209 calculates the drive amount of the focus lens 105 (hereinafter referred to as "a focus drive amount") by using the focus sensitivity corresponding to the defocus detection image height calculated at step 7 and the defocus amount detected at step 2. When receiving the central focus sensitivity from the lens microcomputer of the second interchangeable lens (that is, when proceeding from step 12 to step 8), the camera microcomputer 209 calculates at step 8 the focus drive amount by using the central focus sensitivity and the defocus amount detected at step 2.

Next, at step 9, the camera microcomputer 209 sends a focus drive command containing the focus drive amount to the lens microcomputer 110 (or to the lens microcomputer of the second interchangeable lens).

Upon receipt of the focus drive command, the lens microcomputer 110 or the lens microcomputer of the second interchangeable lens drives at step 13 the focus lens 105 by the focus drive amount contained in the focus drive command. Thereafter, the camera microcomputer 209 returns to step 3 to determine whether or not the in-focus state has been acquired.

When the camera microcomputer 209 calculates the focus drive amount by using the focus sensitivity not corresponding to the defocus detection image height in a case where the first interchangeable lens 100 is attached to the camera body 200, an in-focus state cannot be acquired, resulting in a repetitive loop from step 3 to step 13. This repetitive loop requires a long period of time to acquire an in-focus state or makes it impossible to acquire the in-focus state, which is undesirable. This embodiment, however, calculates the focus drive amount by using the focus sensitivity corresponding to the defocus detection image height, which enables acquiring an in-focus state in a short period of time.

[Embodiment 2]

Figure 7:
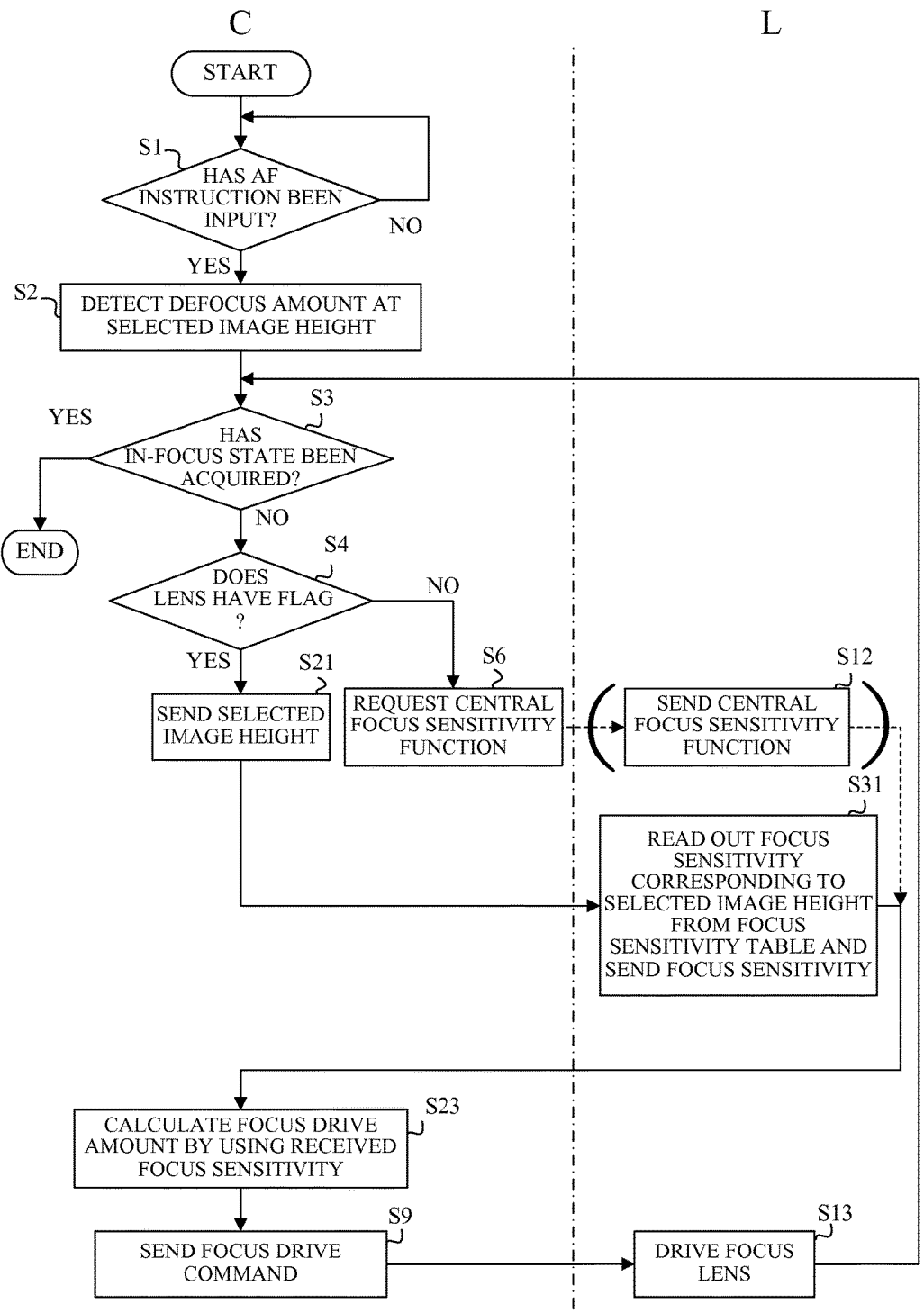
FIG. 7 is a flowchart illustrating an AF process in an image capturing system that is Embodiment 2 of the present invention.

With reference to a flowchart of FIG. 7, description will be made of an AF process by method 3 executed by the camera microcomputer 209 and the lens microcomputer 110. The camera microcomputer 209 and the lens microcomputer 110 execute this AF process according to computer programs installed therein. In FIG. 7, C represents processes executed by the camera microcomputer 209, and L represents processes executed by the lens microcomputer 110. In this embodiment, the lens microcomputer 110 serves as a sensitivity acquirer and a sensitivity sender, and the camera microcomputer 209 serves as a drive amount calculator.

Steps 1 to 4 are the same as those in the flowchart of FIG. 6. When determining at step 4 that the first interchangeable lens 100 having the flag information is attached to the camera body 200, the camera microcomputer 209 sends at step 21 the selected image height (defocus detection image height) to the lens microcomputer 110.

At step 31, the lens microcomputer 110 reads out (acquires) the focus sensitivity corresponding to the defocus detection image height from the focus sensitivity table stored in the memory 120 and sends the focus sensitivity to the camera microcomputer 209.

At step 23, the camera microcomputer 209 calculates the focus drive amount by using the focus sensitivity corresponding to the defocus detection image height received from the lens microcomputer 110 and the defocus amount detected at step 2.

On the other hand, when determining, at step 4, that the second interchangeable lens not having the flag information is attached to the camera body 200, the camera microcomputer 209 proceeds to step 6. Step and step 12, which is executed by the lens microcomputer of the second interchangeable lens, are the same as those in FIG. 6, respectively. In this case, at step 23, the camera microcomputer 209 calculates the focus drive amount by using the received central focus sensitivity and the defocus amount detected at step 2.

Subsequent steps 9 and 13 are the same as those in FIG. 6, respectively. Thereafter, the camera microcomputer 209 returns to step 3 to determine whether or not an in-focus state has been acquired.

[Embodiment 3]

Embodiments 1 and 2 described the case where the camera microcomputer 209 calculates the focus drive amount by using the defocus amount and the focus sensitivity and sends the focus drive command containing the focus drive amount to the lens microcomputer 110. However, the lens microcomputer 110 may alternatively calculate the focus drive amount by using the defocus amount received from the camera microcomputer 209 and the focus sensitivity (the focus sensitivity table or the focus sensitivity function) stored therein.

Figure 8:
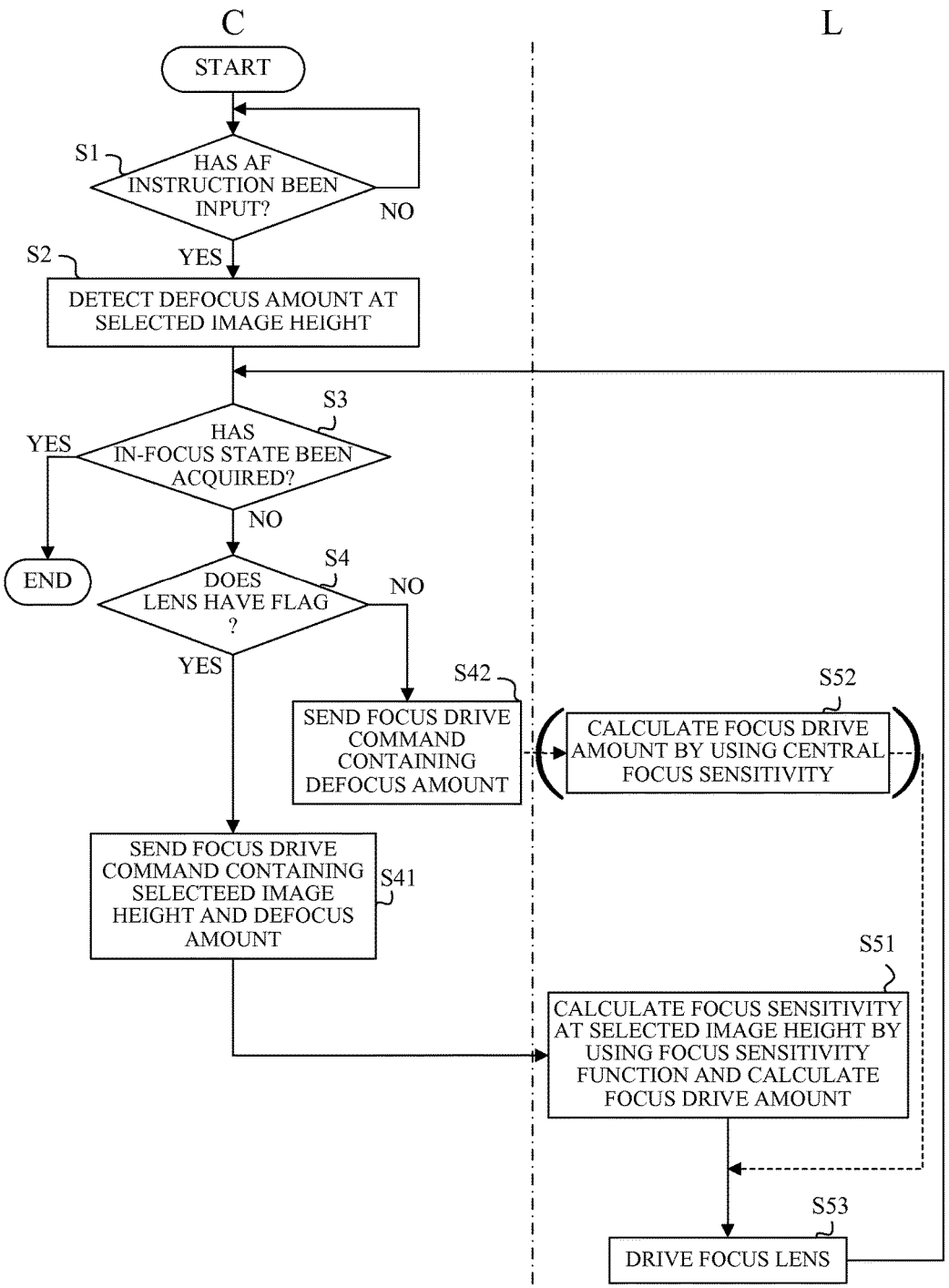
FIG. 8 is a flowchart illustrating an AF process in an image capturing system that is Embodiment 3 of the present invention.

With reference to a flowchart of FIG. 8, description will be made of an AF process in a third embodiment (Embodiment 3) of the present invention executed by the camera microcomputer 209 and the lens microcomputer 110. The camera microcomputer 209 and the lens microcomputer 110 execute this AF process according to computer programs installed therein. In FIG. 8, C represents processes executed by the camera microcomputer 209, and L represents processes executed by the lens microcomputer 110. In this embodiment, the camera microcomputer 209 serves as an image height sender, and the lens microcomputer 110 serves as a sensitivity acquirer and a drive amount calculator.

Steps 1 to 4 are the same as those in the flowchart of FIG. 6. When determining at step 4 that a first interchangeable lens 100 having a flag corresponding to an image height is flag is mounted on a camera body 200, the camera microcomputer 209 proceeds to step 41. At step 41, the camera microcomputer 209 sends, to the lens microcomputer 110, the defocus amount detected at step 2 at the selected image height (defocus detection image height) and the defocus detection image height. At step 51, the lens microcomputer 110 reads out the focus sensitivity corresponding to the received defocus detection image height from the focus sensitivity table stored in the memory 120.

When the memory 120 stores the focus sensitivity function, the lens microcomputer 110 calculates the focus sensitivity corresponding to the defocus detection image height by substituting the received defocus detection image height into the focus sensitivity function.

On the other hand, when determining at step 4 that the second interchangeable lens not having the flag information is attached to the camera body 200, the camera microcomputer 209 proceeds to step 42. At step 42, the camera microcomputer 209 sends, to the lens microcomputer of the second interchangeable lens, the defocus amount detected at the selected image height. The lens microcomputer of the second interchangeable lens calculates at step 52 the focus drive amount by using the received defocus amount and the central focus sensitivity stored in the memory included in the second interchangeable lens.

At step 53, the lens microcomputer 110 or the lens microcomputer of the second interchangeable lens drives the focus lens 105 by the calculated focus drive amount. Thereafter, the camera microcomputer 209 returns to step 3 to determine whether or not an in-focus state has been acquired.

Table 1 shows the above-mentioned numerical example. In Table 1, a surface number i represents order of an i-th surface from an object side, r represents a radius of curvature of the i-th surface, d represents a distance between the i-th surface and an (i+1)-th surface, and nd and vd respectively represent a refractive index and an Abbe number of a medium between the i-th and (i+1)-th surfaces for a d-line.

Table 1 shows a focal length and an F-number of the entire image capturing optical system and furthermore shows a half field angle of the entire image capturing optical system as "a field angle" and a maximum image height defining the half field angle as "an image height". An entire lens length represents a distance from a first lens surface to a final lens surface, BF represents a distance from the final lens surface to an image surface.

An aspheric shape satisfies, when Sag(R) represents a position in the optical axis direction away from the optical axis by a distance R in a direction orthogonal to the optical axis, a relation expressed by expression (2). Aspheric coefficients in expression (2) are shown in Table 1.

$$Sag(R) = \frac{(1/r) \times R^2}{1 + \sqrt{1 - (1+K) \times (1/r)^2 \times R^2}} +$$

$$A4 \times R^4 + A6 \times R^6 + A8 \times R^8 + A10 \times R^{10} + A12 \times R^{12}$$

TABLE 1

UNIT: mm

SURFACE DATA

| SURFACE NUMBER | r | d | nd | vd |
|---|---|---|---|---|
| 1* | 100.539 | 3.10 | 1.77250 | 49.6 |
| 2 | 32.720 | 10.72 | | |
| 3 | 42.149 | 3.20 | 1.58443 | 59.4 |
| 4* | 20.166 | 10.92 | | |
| 5 | 100.105 | 2.60 | 1.85000 | 40.3 |
| 6* | 47.636 | 5.78 | | |
| 7 | 313.609 | 1.30 | 1.59522 | 67.7 |
| 8 | 24.149 | 7.52 | | |
| 9 | −76.917 | 1.15 | 1.43875 | 94.9 |
| 10 | 63.963 | 0.90 | | |
| 11 | 39.306 | 6.40 | 1.72047 | 34.7 |
| 12 | −123.368 | 26.34 | | |
| 13 | ∞ | 10.01 | | |
| 14 (STOP) | ∞ | 1.35 | | |
| 15 | 20.881 | 1.10 | 2.00100 | 29.1 |
| 16 | 15.582 | 7.48 | 1.57501 | 41.5 |
| 17 | −34.521 | 2.04 | | |
| 18 | −26.282 | 0.90 | 1.91082 | 35.3 |
| 19 | 67.219 | 2.28 | 1.80518 | 25.4 |
| 20 | −88.351 | 3.47 | | |
| 21 | ∞ | −0.18 | | |
| 22 | 29.749 | 0.95 | 1.88300 | 40.8 |
| 23 | 14.149 | 6.33 | 1.51742 | 52.4 |
| 24 | −96.774 | 0.95 | 1.83481 | 42.7 |
| 25 | 121.738 | 0.15 | | |
| 26 | 22.701 | 6.42 | 1.49700 | 81.5 |
| 27 | −27.173 | 0.20 | | |
| 28 | −203.270 | 1.10 | 1.88300 | 40.8 |
| 29 | 16.518 | 7.00 | 1.58313 | 59.4 |
| 30* | −89.237 | | | |

ASPHERIC SURFACE DATA

1ST SURFACE

K = 0.00000e+000   A 4 = 5.05206e−006   A 6 = −3.63429e−009
A 8 = 2.11935e−012   A10 = −1.41510e−016   A12 = −3.57290e−019
A14 = 1.42245e−022

4TH SURFACE

K = −3.12496e+000   A 4 = 3.80172e−005   A 6 = −6.43816e−008
A 8 = 1.70459e−011   A10 = 1.23661e−014

6TH SURFACE

K = 0.00000e+000   A 4 = 1.17599e−005   A 6 = −2.78334e−009
A 8 = 2.11164e−010   A10 = −7.67189e−013   A12 = 1.22364e−015

30TH SURFACE

K = 0.00000e+000   A 4 = 1.97099e−005   A 6 = 3.47379e−008
A 8 = −4.33773e−012   A10 = 7.33806e−014   A12 = 6.25102e−015

VARIOUS DATA

| | |
|---|---|
| FOCAL LENGTH | 11.33 |
| F-NUMBER | 4.12 |
| FIELD ANGLE | 62.36 |
| IMAGE HEIGHT | 21.64 |
| ENTIRE LENS LENGTH | 171.35 |
| BF | 39.87 |

Although Embodiments 1 to 3 described the case where the interchangeable lens stores the information on the focus sensitivity corresponding to the image height, a lens-integrated image capturing apparatus, which is an image capturing apparatus including an image capturing optical system integrated therewith, may alternatively store the information on the focus sensitivity corresponding to the image height. In this case, a microcomputer of the image capturing apparatus calculates the focus drive amount by using the focus sensitivity corresponding to the defocus detection image height to drive the focus lens.

[Embodiment 4]

Figure 16:
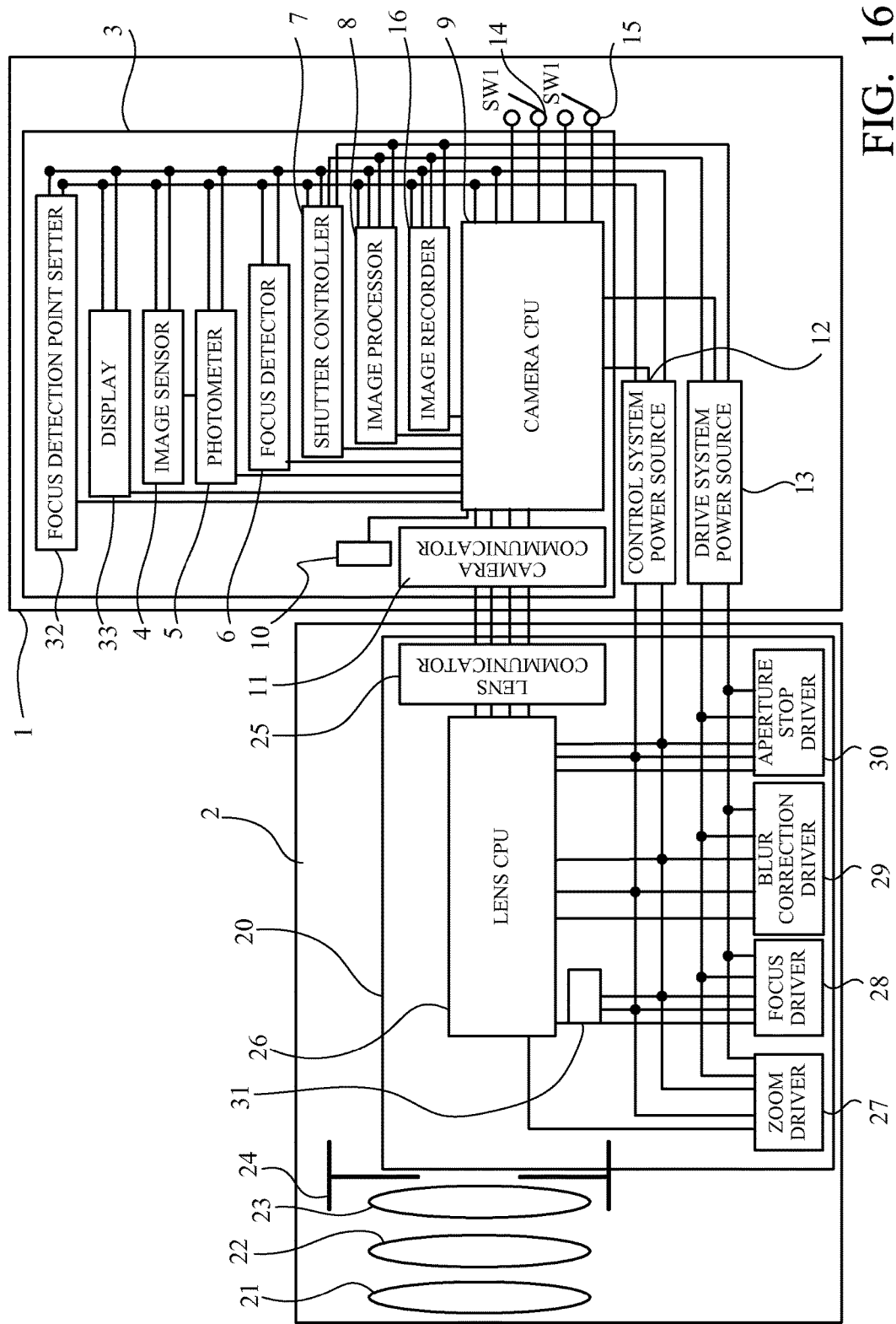
FIG. 16 is a block diagram of an image capturing system in Embodiments 4, 5 and 6.

FIG. 16 is a block diagram illustrating a configuration of a camera system (image capturing system) that is a fourth embodiment (Embodiment 4) of the present invention. The configuration of the camera system is common to those in fifth and sixth embodiments described later. The camera system includes a camera body (image capturing apparatus) 1 and an interchangeable lens (lens apparatus) 2 interchangeably attached to the camera body.

The camera body 1 includes an electric circuit 3, a control system power source 12, a drive system power source 13 and others.

The electric circuit 3 includes an image sensor 4, a photometer 5, a focus detector 6, a shutter controller 7, an image processor 8, a camera CPU 9, a lens attachment detector 10, a camera communicator 11, an image recorder 16, a focus detection point setting member 32 and a display 33.

The image sensor 4 is a photoelectric conversion element constituted by a CCD sensor or a CMOS sensor and converts an object image formed by an image capturing optical system of the interchangeable lens 2 into an electric signal. The image sensor 4 includes multiple focus detection pixels whose image heights are mutually different.

The photometer 5 measures a light amount (luminance) passing through the interchangeable lens 2 by using output from the image sensor 4.

The focus detector (focus detector) 6 detects, by a so-called imaging surface phase difference detection method, a focus state (defocus amount) of the interchangeable lens 2 at a focus detection point (focus detection position) set by using outputs of the multiple focus detection pixels provided in the image sensor 4. The imaging surface plane phase difference detection method refers to a method of performing focus detection by a phase difference detection method by using the focus detection pixels provided on an imaging surface of the image sensor 4. The phase difference detection method refers to a method of performing the focus detection by detecting a phase difference between paired image signals corresponding to paired object images.

The imaging surface plane phase difference detection method is classified into a DAF method and an SAF method, both of which are applicable to this embodiment. Moreover, an alternative configuration may be used in which a mirror deflects light to introduce the light to a dedicated focus detector that performs the focus detection by the phase difference detection method.

The DAF method is a method of providing multiple sub-pixels (for example, two or four sub-pixels) for each microlens that performs pupil division and producing the paired image signals corresponding to the paired object images, from outputs from the sub-pixels. The SFA method is a method of providing a focus detection pixel for each microlens with a partial light shield and using outputs from two types of such focus detection pixels whose aperture positions are mutually different as paired outputs to produce the paired image signals corresponding to the paired object images. For instance, this method uses, as the paired outputs, the output from the focus detection pixel provided with the partial light shield whose left half part is opened and the output from the focus detection pixels provided with the partial light shield whose right half part is opened.

Moreover, the focus detection is not limited to the phase difference detection method, and a contrast method may alternatively be used. The focus detection by the contrast method is a method of performing scanning for varying relative positions of a focal position of the image capturing optical system and the imaging surface of the image sensor to detect the relative positions (an in-focus state) at which a contrast of an object image formed on the image sensor becomes a peak.

The shutter controller 7 controls an operation of a shutter (not illustrated) that is opened and closed to control an exposure amount of the image sensor 4.

The image processor 8 performs various processes on outputs from a predetermined number of image capturing pixels provided to the image sensor 4 to produce a captured image. The various processes include a process using image processing information stored in the interchangeable lens 2 and that stored in the camera body 1.

The camera CPU 9 is a camera controller that controls operations of all components of the camera body 1. The camera CPU 9 is constituted by a microcomputer. The camera CPU 9 communicates with a lens CPU 26 via a camera communicator 11 provided to the camera body 1 and a lens communicator 25 provided to the interchangeable lens 2. The camera CPU 9 calculates an aperture value and a shutter speed depending on the luminance acquired by the photometer 5 and sends an aperture stop drive command containing the aperture value to the lens CPU 26. The camera CPU 9 calculates a drive direction and a drive amount of a focus lens 22 depending on the defocus amount calculated by the focus detector 6 and on information on a focus sensitivity described below and sends a focus drive command containing information on the drive direction and the drive amount to the lens CPU 26.

The focus sensitivity is expressed by using a focal displacement amount (a movement amount of an image plane of the image capturing optical system in its optical axis direction with respect to the imaging surface of the image sensor 4) with respect to a movement amount of the focus lens 22 in the optical axis direction. When $\Delta Za$ represents the movement amount of the focus lens 22 in the optical axis direction, and $\Delta Zb$ represents the movement amount of the image plane in the optical axis direction, the focus sensitivity is expressed by $\Delta Zb/\Delta Za$.

The camera CPU 9 thus performs the focus control of the image capturing optical system of the interchangeable lens 2. This series of operations from the defocus amount calculation (focus detection) by the focus detector 6 to the sending of the focus drive command by the camera CPU 9 to the lens CPU 26 (focus control) is referred to as "a camera body side autofocus (AF) process".

The lens attachment detector 10 is constituted by a switch, an optical detector and the like. The lens attachment detector 10 detects that the interchangeable lens 2 is attached to the camera body 1 and outputs a detection signal to the camera CPU 9. The camera communicator 11 performs information communication (receipt and sending of the information) with the lens communicator 25. The image recorder 16 records a recording image and other information in a recording medium (not illustrated). The focus detection point setting member 32 is operated by a user to set one focus detection point as an in-focus target focus detection point corresponding to an object on which the image capturing optical system is focused. The display 33 displays various information of the camera system. The display 33 includes, for example, a liquid crystal display provided on a back surface of the camera body 1.

The control system power source 12 supplies power to control system circuits, such as the image sensor 4, the photometer 5, the focus detector 6, the image processor 8 and the display 33, which have a relatively low power consumption and require a stable voltage supply. The drive system power source 13 supplies power to drive system circuits, such as the shutter controller 7 and the interchangeable lens 2, which have a relatively high power consumption. As just described, the interchangeable lens 2 receives power from the camera body 1.

In the camera body 1, an image capturing preparation switch (SW1) 14, an image capturing start switch (SW2) 15 and an image recorder 16 are provided.

In response to turning-on of the image capturing preparation switch (SW1) 14 by a user, the camera CPU 9 causes the photometer 5 to perform a photometry operation and causes the focus detector 6 to perform a focus detection operation.

In response to turning-on of the image capturing start switch (SW2) 15 by the user, the camera CPU 9 recognizes that an image capturing command has been input and performs the following operations.

The camera CPU 9 first sends, to the lens CPU 26, the aperture stop drive command for driving an aperture stop 24 to an aperture value set for image capturing and causes the shutter controller 7 to perform a shutter operation so as to expose the image sensor 4 at the predetermined shutter speed. Then, the camera CPU 9 causes the image processor 8 to produce a recording image, by using output acquired from the image sensor 4. Furthermore, the camera CPU 9 causes the image recorder 16 to record the recording image in the recording medium. This series of image capturing operations including the exposure, the image producing and the recording is referred to also as "a release process".

The recording images captured as described above include a still image captured in a still image capturing mode set through a mode selector (not illustrated) and a moving image captured in a moving image capturing mode set by the mode selector. Instead, the camera system may have an alternative configuration in which an image recording start button for moving image capturing is additionally provided to allow recording of a moving image to be started in response to pressing thereof. Furthermore, the camera system may have another alternative configuration in which an image recording quality setting switch (not illustrated) provided to the camera body allows the user to select an image recording quality.

The interchangeable lens 2 includes the image capturing optical system forming an object image and an electric circuit 20. The image capturing optical system is constituted by a magnification-varying lens (zoom lens) 21, a focus lens 22, a blur correction lens 23 and the aperture stop 24. The configuration of the image capturing optical system is not limited to this.

The magnification-varying lens 21 is moved in the optical axis direction to vary a focal length of the image capturing optical system (i.e., a distance in the optical axis direction from a principal point to a focal point). The focus lens 22 is moved in the optical axis direction to perform focusing. The blur correction lens 23 is moved in a direction orthogonal to the optical axis direction to reduce image blur caused by camera shaking. "The direction orthogonal to the optical axis direction" is satisfied by presence of a component orthogonal to the optical axis and therefore may be moved obliquely to the optical axis. The aperture stop 24 is disposed at a position of an exit pupil of the image capturing optical system. The aperture stop 24 forms an aperture whose diameter (aperture value) is variable and varies, depending on the diameter, a light amount entering the image sensor 4.

The electric circuit 20 includes the lens communicator 25, the lens CPU 26, a zoom driver 27, a focus driver 28, a blur correction driver 29 and an aperture stop driver 30.

The lens communicator 25 communicates with the camera CPU 9 to receive and send image capturing information of the camera body, the information on the focus sensitivity (hereinafter referred to as "focus sensitivity information") depending on an image capturing situation, the focus drive command and others. The lens CPU 26, which is constituted by a microcomputer, is a lens controller that controls all components of the interchangeable lens 2.

The lens CPU 26 outputs a focus drive signal to the focus driver 28 depending on the focus drive command received from the camera CPU 9. The focus driver 28 includes an actuator such as a stepping motor, a vibration-type motor or a voice coil motor. The focus driver 28 drives the focus lens 22 depending on the focus drive signal from the lens CPU 26. The focus lens 22 is thus moved to an in-focus position. This series of operations from the focus drive command to the driving of the focus lens 22 to the in-focus position is referred to as "an interchangeable lens side AF process".

The lens CPU 26 outputs an aperture stop drive signal to the aperture stop driver 30 depending on the aperture stop drive command. The aperture stop driver 30 includes an actuator such as a stepping motor. The aperture stop driver 30 drives the aperture stop 24 depending on the aperture stop drive signal from the lens CPU 26.

The lens CPU 26 outputs, to the zoom driver 27, a zoom drive signal for moving the magnification-varying lens 21 in a zoom direction and at a zoom drive speed both depending on a user's operation of a zoom operation ring (not illustrated) provided to the interchangeable lens 2. The zoom driver 27 includes an actuator such as a stepping motor. The zoom driver 27 drives the magnification-varying lens 21 depending on the zoom drive signal from the lens CPU 26.

The lens CPU 26 outputs, to the blur correction driver 29, a blur drive signal depending on a blur detection signal from a shake sensor such as an acceleration sensor (not illustrated) provided to the interchangeable lens 2. The blur correction driver 29 includes an actuator such as a voice coil motor. The blur correction driver 29 drives the blur correction lens 23 depending on the blur correction drive signal from the lens CPU 26.

The lens CPU 26 sends, to the camera CPU 9, data containing focal position shift information and the focus sensitivity information to be used to correct a focus detection result (defocus amount) stored in a memory 31 constituted by a storage element such as an EEPROM and a ROM. The memory 31 may be placed inside the lens CPU 26.

Figure 9:
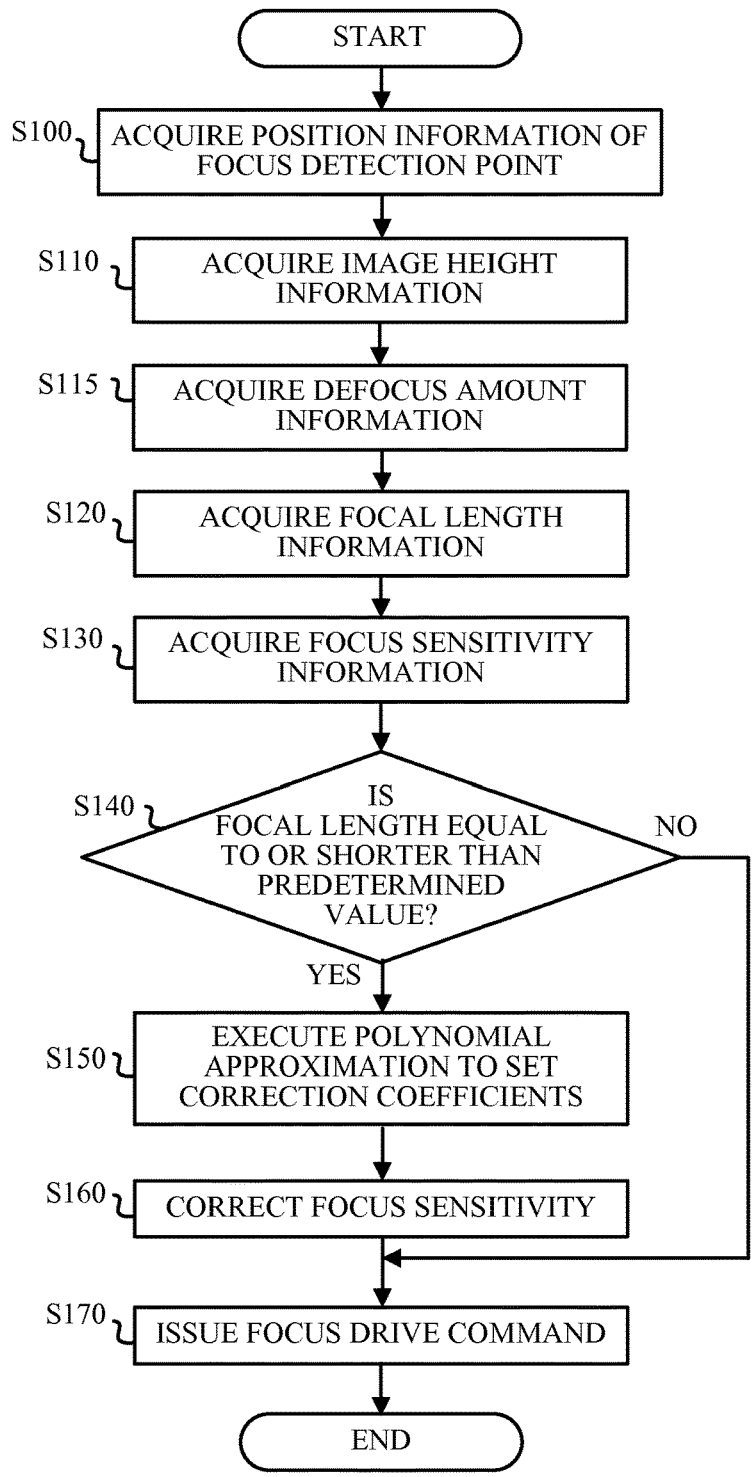
FIG. 9 is a flowchart illustrating an operation of an image capturing apparatus that is Embodiment 4 of the present invention.

FIG. 9 is a flowchart illustrating an AF process (autofocus method) of a camera CPU 9 in this embodiment. In the flowchart of FIG. 9 and other flowcharts, "S" stands for step. Each step of the flowchart of FIG. 9 and that of other drawings can be embodied as a program to cause a computer to execute each step. A non-transitory computer-readable storage medium storing the program constitutes as an alternative embodiment of the present invention.

First, at step 100, the camera CPU 9 acquires position information of the focus detection point set by the user through the focus detection point setting member 32. Alternatively, the camera CPU 9 may be configured to automatically set the focus detection point settable by the focus detection point setting member 32.

Figure 12:
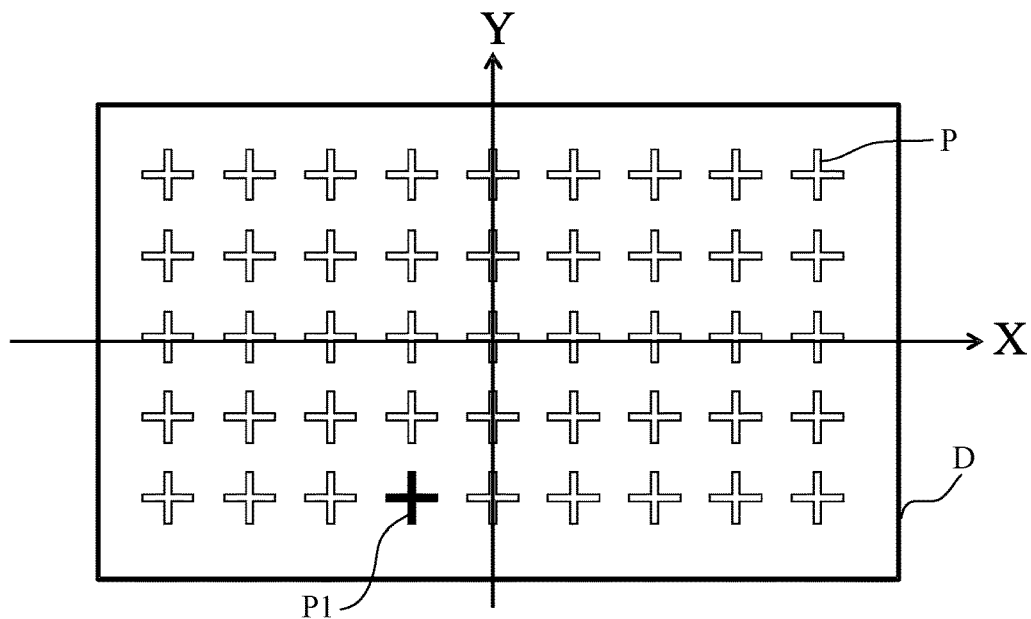
FIG. 12 illustrates an example of positions of focus detection points in Embodiment 4.

FIG. 12 illustrates an example of an array of the focus detection points set in the camera body 1. In FIG. 12, D shown by a bold line represents an image capturing frame displayed on, for example, a liquid crystal display element of the display 33. Furthermore, a white plus mark P shown by represents each focus detection point. In the example illustrated in FIG. 12, the focus detection points are provided in the image capturing frame in a five-by-nine matrix. A black plus mark P1 represents, of the focus detection points P, one focus detection point set to the in-focus target focus detection point through the focus detection point setting member 32. The user normally selects and sets, as the in-focus target focus detection point, one of the focus detection points corresponding to a position of a main object.

The position information of the focus detection point is information on an image height from a center of the image capturing frame with the center being zero. As illustrated in FIG. 12, the image height IH is expressed by expression (16) by using X-Y coordinates (X,Y). However, a method of expressing the image height is not limited to that illustrated in the drawing, and may be that using coordinates with its center being shifted from the center of the image capturing frame.

$$IH=\sqrt{X^2+Y^2} \quad (16)$$

Next, at step 110, the camera CPU 9 acquires, from the position coordinates of the focus detection point set by the focus detection point setter 32, the information of the image height (hereinafter referred to as "image height information") by using expression (16). The image height information varies depending on the set in-focus target focus detection point.

Then, at step 115, the camera CPU 9 acquires information on a focus state (defocus amount) of the image capturing optical system from the focus detector 6.

Subsequently, at step 120, the camera CPU 9 acquires, from the lens CPU 26, the information on the focal length (hereinafter referred to as "focal length information") of the image capturing optical system via the lens communicator 25 and the camera communicator 11.

Next, at step 130, the camera CPU 9 acquires, from the lens CPU 26, the focus sensitivity information via the lens communicator 25 and the camera communicator 11. The lens CPU 26 has already acquired information on a position of the image sensor 4 on the optical axis in its initial communication with the camera CPU 9 and therefore can acquire the focus sensitivity information depending on the information on the position of the image sensor 4 and optical information of the focus lens 22.

The lens CPU 26 acquires optical information including information on an optical position of the image capturing optical system, on the aperture value of an aperture stop 24 and on accessories (not illustrated). The lens CPU 26 further acquires the focus sensitivity information from a sensitivity table stored in a memory (not illustrated) such as a ROM. The focus sensitivity is a value corresponding to a center of the image plane, that is, corresponding to an image height of zero.

The interchangeable lens 2 may further include a built-in extender (optical unit) that changes optical characteristics of the image capturing optical system (that is, changes a focal length range of the entire image capturing optical system).

In response to a user's mechanical operation of an operation portion, such as a lever, provided to a lens barrel of the interchangeable lens 2, the built-in extender is inserted into or retracted from an optical path of the image capturing optical system without detachment of the interchangeable lens 2. The insertion or the retraction of the extender into or from the optical path varies the optical characteristics of the image capturing optical system such as the focal length, a brightness and aberrations.

Execution of at least one of steps 120 and 130 in attachment of the interchangeable lens 2 to the camera body 1 or in power-on of the camera body 1 makes it impossible to deal with a change in the focal length and the focus sensitivity subsequently caused by driving of the magnification-varying lens 21 or the insertion or retraction of the built-in extender. In order to avoid such a situation, upon detection of a change in a position of the magnification-varying lens 21 or in a state of the insertion or retraction of the built-in extender by a detector (not illustrated), the lens CPU 26 sends the focal length information (step 120) and the focus sensitivity information (step 130) to the camera CPU 9. That is, when at least one of the focal length and the focus sensitivity changes after step 120 or 130, the camera CPU 9 reacquires the focal length and the focus sensitivity.

Next, at step 140, the camera CPU 9 determines whether the focal length is equal to or higher than a predetermined value depending on the focal length information acquired from the lens CPU 26. The predetermined value (threshold) of the focal length is prestored is a memory (not illustrated) such as a ROM provided in the camera body 1. The variation in the focus sensitivity depending on the position of the focus detection point can be found particularly in lenses with a short focal length (wide-angle lenses). For this reason, when the interchangeable lens 2 has a focal length equal to or shorter than the predetermined focal length, the camera CPU 9 corrects the focus sensitivity.

On the other hand, when the interchangeable lens 2 has a focal length longer than the predetermined focal length, since the focus sensitivity varies less in such an interchangeable lens 2, the camera CPU 9 uses the acquired focus sensitivity without correction thereof. In this case, the camera CPU 9 is not required to execute step 150 or 160 and thus can execute an in-focus operation at high speed.

As described above, the camera CPU 9 of this embodiment does not correct the focus sensitivity when the focal length is longer than the predetermined value and corrects the focus sensitivity when the focal length is equal to or shorter than the predetermined value.

When the focal length is equal to or shorter than the predetermined value at step 140, the camera CPU 9 executes, at step 150, a polynomial approximation depending on the focal length information acquired from the lens CPU 26 to set correction coefficients described below for correcting the focus sensitivity.

Figure 13:
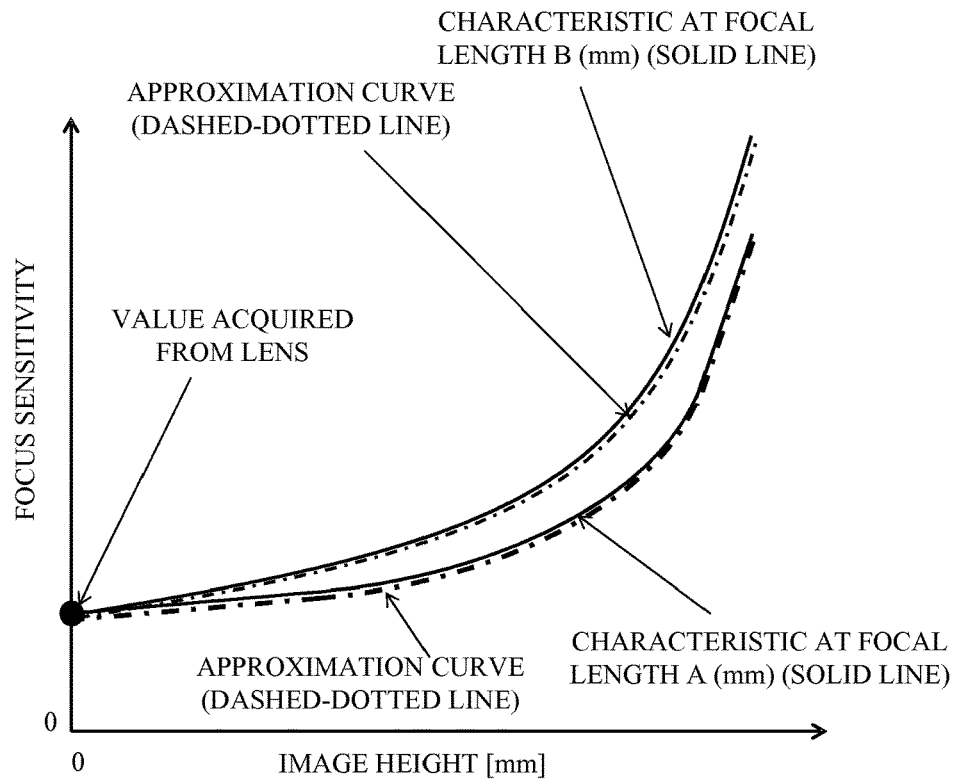
FIG. 13 is a graph illustrating a method of approximating a characteristic of focus sensitivity in Embodiment 4.

FIG. 13 illustrates a method of approximating a characteristic of the focus sensitivity in Embodiment 4. In the drawing, a horizontal axis indicates the image height (mm), and a vertical axis indicates the focus sensitivity. A focal length A(mm) and a focal length B(mm) are examples of the focal length equal to or shorter than the predetermined value at step 140 and have a relation of A>B. As indicated by a dashed-dotted line in FIG. 13, the camera CPU 9 approximates the characteristic of the focus sensitivity indicated by a solid line in FIG. 13, by utilizing expression (17) that is a polynomial of the coordinates (position) (X,Y) of the focus detection point. In expression (17), $S_0$ represents the focus sensitivity, $a_0$ to $a_5$ are the correction coefficients for correcting the focus sensitivity. Expression (17) is an expression for approximating the characteristic of the focus sensitivity corresponding to the position of the focus detection point (in-focus target focus detection point) P1.

$$S(X, Y) = S_0(a_0 + a_1 X^2 + a_2 X^4 + a_3 Y^2 + a_4 Y^4 + a_5 X^2 Y^2) \qquad (17)$$

The correction coefficients $a_0$ to $a_5$ can be acquired from a correction coefficient table provided for each focal length and prestored in a storage area (not illustrated) such as a ROM in the camera body 1; the correction coefficients $a_0$ to $a_5$ are thus dependent on the focal length.

Next, at step 160, the camera CPU 9 corrects the focus sensitivity according to expression (17), by using the correction coefficients set at step 150 and the information on the coordinates (position) (X,Y) of the focus detection point.

When the focal length is longer than the predetermined value after step 160 or at step 140, the camera CPU 9 issues, at step 170, the focus drive command depending on the focus sensitivity. Specifically, the camera CPU 9 converts the focal length into the drive amount of the focus lens 22 by using the focus sensitivity such that the focus state detected by the focus detector 6 becomes an in-focus state (that is, such that the defocus amount decreases to or becomes zero). The corrected focus sensitivity is used when step 170 is executed after step 160, and on the other hand the focus sensitivity acquired at step 130 is used when step 170 is executed after a negative determination (NO) is made at step 140.

Since the focus drive command contains the information on the drive direction and the drive amount of the focus lens 22, the camera CPU 9 calculates the drive direction and the drive amount of the focus lens 22 depending on the focus sensitivity. The lens CPU 26 acquires the drive direction (e.g., a rotation direction of the motor) and the drive amount (a rotation angle of the motor) of the focus driver 28 depending on the information on the calculated drive direction and amount and then drives the focus lens 22 via the focus driver 28.

Although this embodiment approximates, as indicated by the dashed-dotted line in FIG. 13, the characteristic of the focus sensitivity indicated by the solid line in FIG. 13 to decrease a storage capacity of the memory (ROM), the approximation is not necessarily required. That is, alternatively, the camera CPU 9 may store, in the memory, a graph of the characteristic of the focus sensitivity indicated by the solid line in FIG. 13 without approximating the characteristic and acquire the focus sensitivity by utilizing the stored information. This alternative process requires a larger storage capacity, but enables improving an in-focus accuracy.

Although, in this embodiment, the memory stores information on the characteristics of the focus sensitivity corresponding to multiple focal lengths including a focal length A, a focal length B and others, a current focal length may not coincide with the stored focal length. In this case, the camera CPU 9 may acquire a characteristic of the focus sensitivity corresponding to a non-stored focal length by an interpolation calculation, depending on the characteristics of the focus sensitivity corresponding to the discretely stored focal lengths.

[Embodiment 5]

Embodiment 4 approximates, with the polynomial of the coordinates (X,Y) of the focus detection point, the characteristic of the focus sensitivity indicated by the solid line in FIG. 13 by utilizing expression (17) as indicated by the dashed-dotted line in FIG. 13. On the other hand, Embodiment 5 linearly approximates, as indicated by a dashed-dotted line in FIG. 14, the characteristic of the focus sensitivity indicated by a solid line in FIG. 14, by utilizing expression (18).

Figure 10:
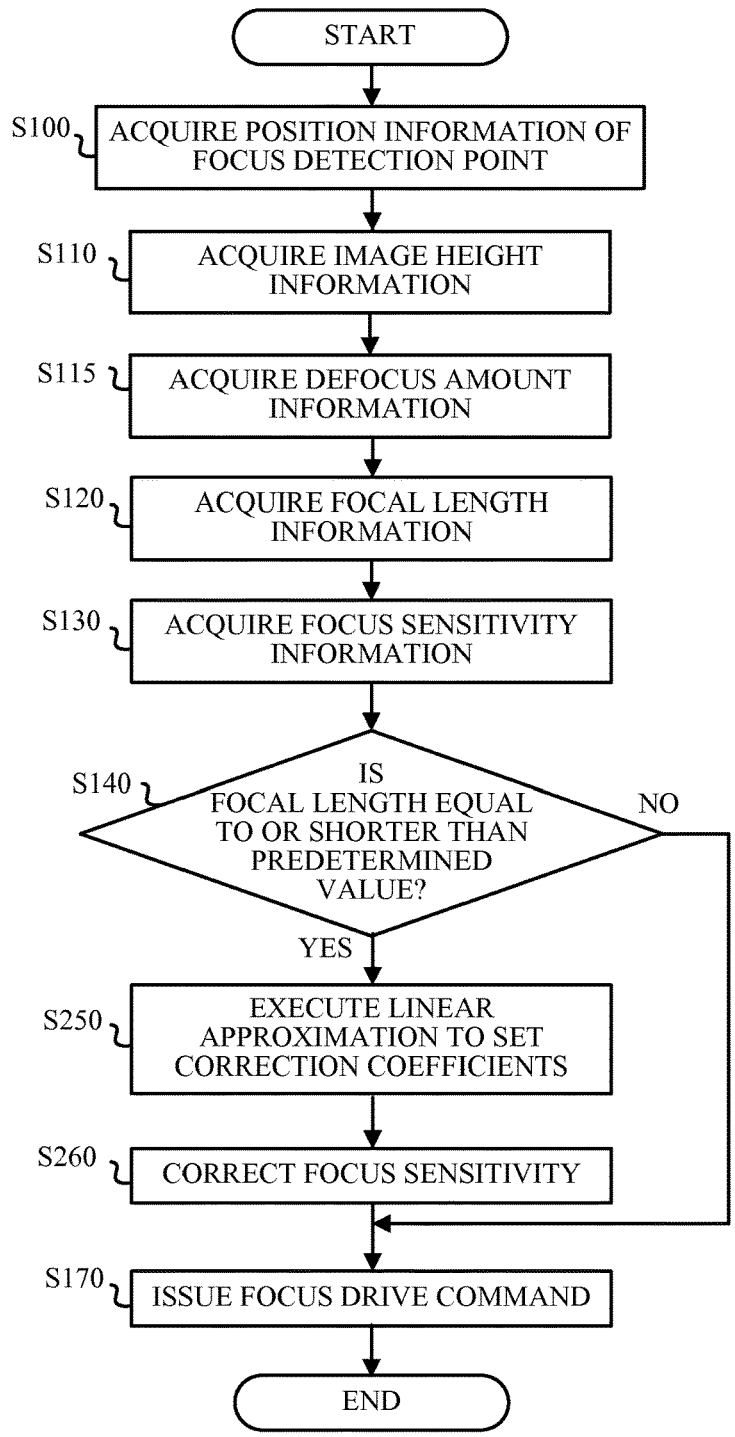
FIG. 10 is a flowchart illustrating an operation of an image capturing apparatus that is Embodiment 5 of the present invention.

FIG. 10 is a flowchart illustrating an AF process (autofocus method) of the camera CPU 9 of Embodiment 5. In FIG. 10, the same steps as those of FIG. 9 are denoted by the same step numbers. A flowchart shown in FIG. 10 includes steps 250 and 260 instead of steps 150 and 160 shown in FIG. 9.

When a focal length is equal to or smaller than a predetermined value at step 140, the camera CPU executes, at step 250, a linear approximation depending on the focal length information acquired from the lens CPU 26 to set correction coefficients for correcting the focus sensitivity.

Figure 14:
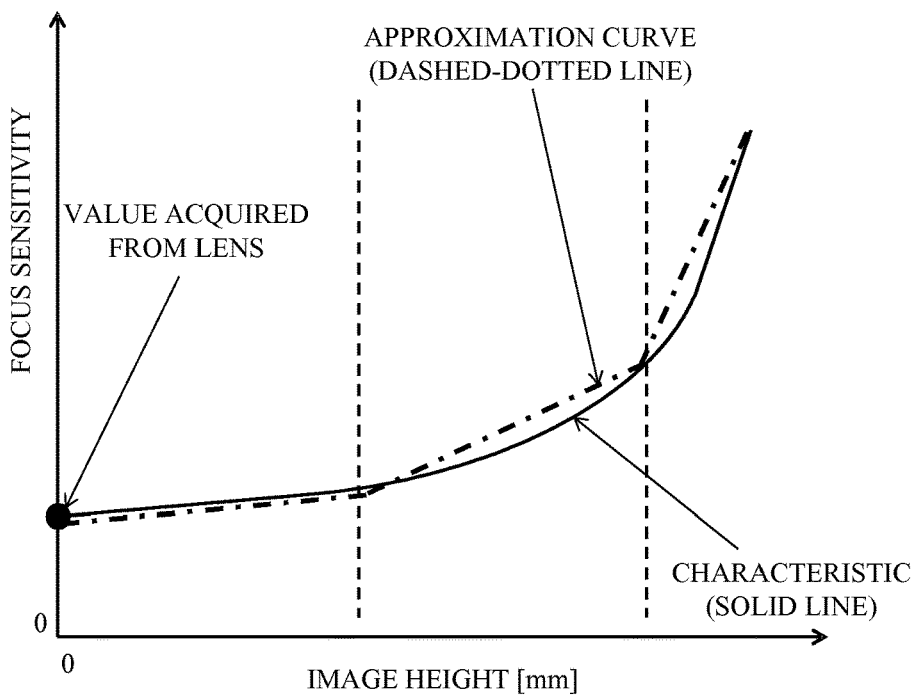
FIG. 14 is a graph illustrating a method of approximating a characteristic of focus sensitivity in Embodiment 5.

FIG. 14 illustrates a method of approximating the characteristic of the focus sensitivity in Embodiment 5. In the drawing, a horizontal axis indicates the image height (mm), and a vertical axis indicates the focus sensitivity. As indicated by the dashed-dotted line in FIG. 14, the camera CPU 9 performs the linear approximation of the characteristic of the focus sensitivity indicated by the solid line in FIG. 14, by utilizing expression (18). In expression (18), $S_0$ represents the focus sensitivity, and $b_0$ and $b_1$ represent the correction coefficients for correcting the focus sensitivity. Expression (18) is an expression for approximating the characteristic of the focus sensitivity corresponding to the position of the focus detection point (in-focus target focus detection point) P1.

As illustrated in FIG. 14, the camera CPU 9 divides an entire image height range into multiple image height ranges and performs a first-order approximation (linear approximation) to approximate a characteristic of the focus sensitivity with a straight line in each divided image height range. Number of the divided image height ranges and a method of setting division positions can be arbitrary selected.

$$S(X, Y) = S_0 \times (b_0 + b_1 \sqrt{X^2 + Y^2}) \qquad (18)$$

The correction coefficients $b_0$ and $b_1$ can be acquired from a correction coefficient table prestored in the storage area in the camera body 1 as in Embodiment 4.

Next, at step 260, the camera CPU 9 corrects the focus sensitivity according to expression (18), by using the correction coefficients set at step 250 and the information on the coordinates (X,Y) of the focus detection point. Embodiment 5 requires a smaller number of the correction coefficients than that in Embodiment 4 and thus requires less storage capacity than that in Embodiment 4. When the focal length is longer than the predetermined value after step 260 or at step 140, the camera CPU 9 executes step 170.

[Embodiment 6]

Figure 11:
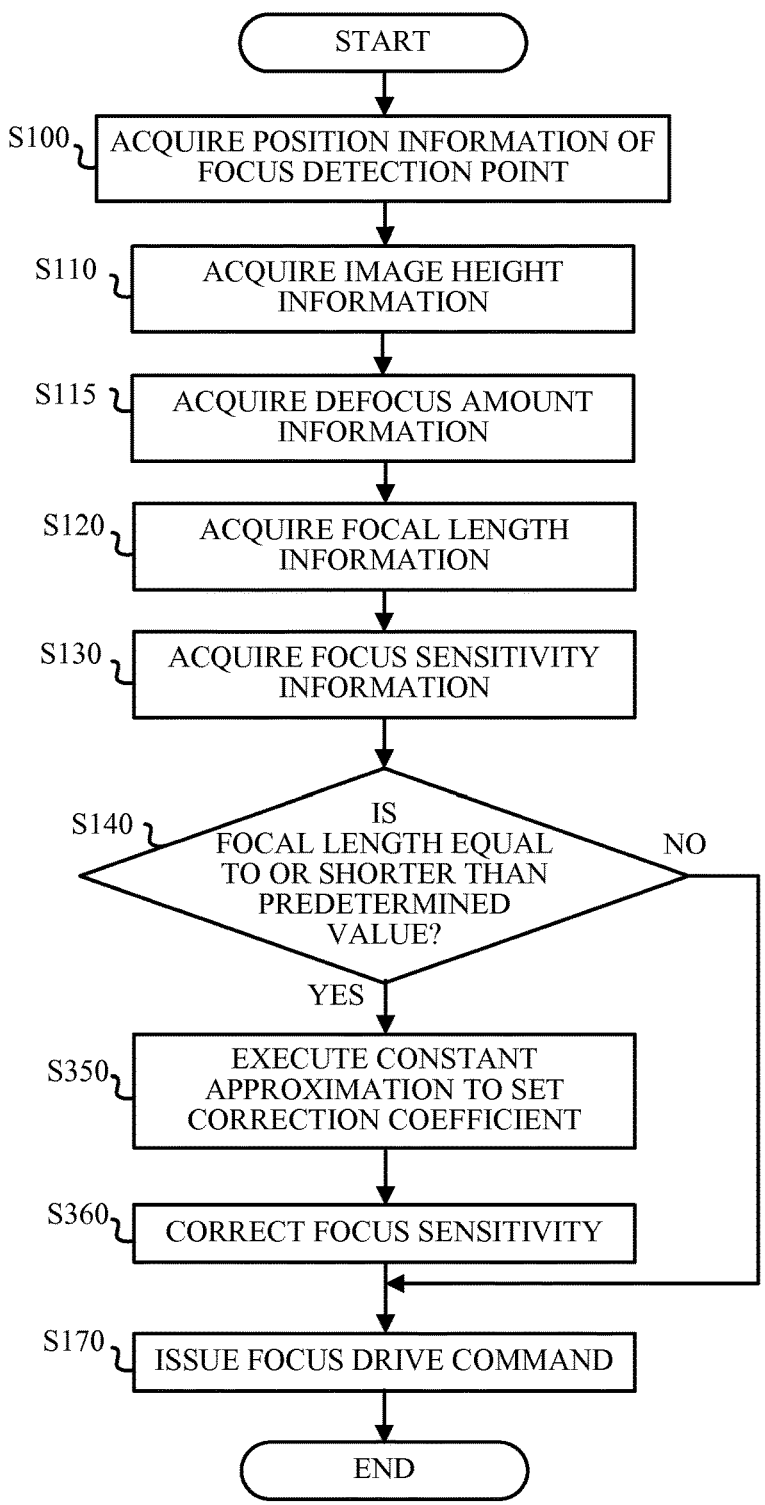
FIG. 11 is a flowchart illustrating an operation of an image capturing apparatus that is Embodiment 6 of the present invention.
Figure 15:
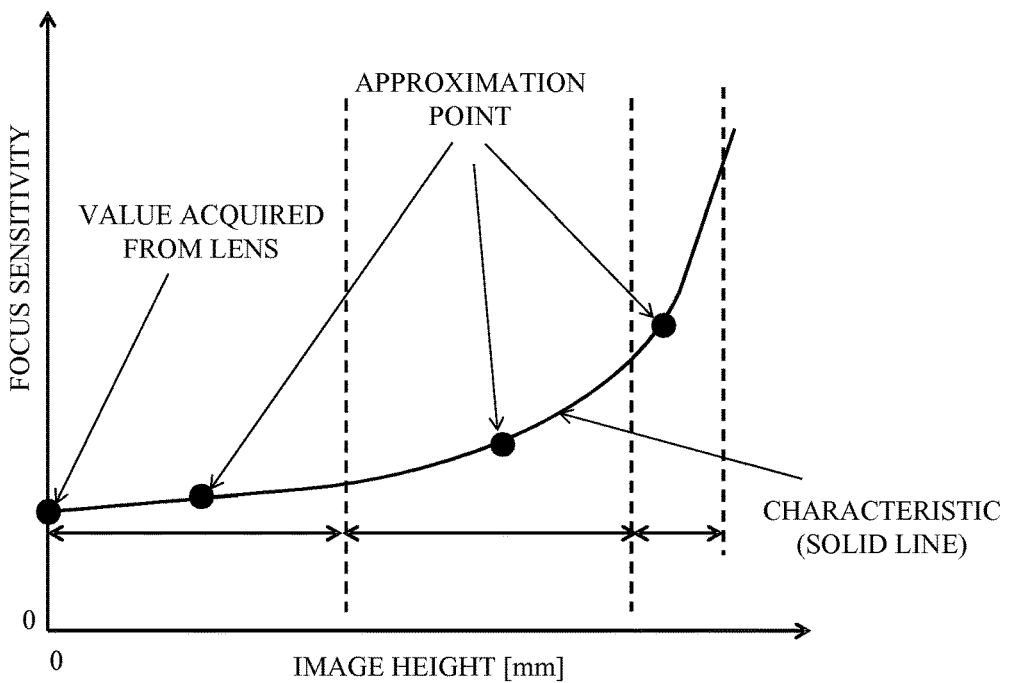
FIG. 15 is a graph illustrating a method of approximating a characteristic of focus sensitivity in Embodiment 6.

In Embodiment 6, the camera CPU 9 approximates the characteristic of the focus sensitivity indicated by a solid line in FIG. 15, by constants as indicated by black circles in FIG. 15. FIG. 11 is a flowchart illustrating an AF process (autofocus method) of the camera CPU 9 of Embodiment 6. In FIG. 11, the same steps as those of FIG. 9 are denoted by the same step numbers. The flowchart shown in FIG. 11 includes steps 350 and 360 instead of steps 150 and 160 shown in FIG. 9.

When the focal length is equal to or shorter than a predetermined value at step 140, the camera CPU executes, at step 350, a constant approximation depending on the focal length information acquired from the lens CPU 26 to set a correction coefficient for correcting the focus sensitivity.

FIG. 15 illustrates a method of approximating the characteristic of the focus sensitivity in Embodiment 6. In the drawing, a horizontal axis indicates the image height (mm), and a vertical axis indicates the focus sensitivity. As indicated by black circles in FIG. 15, the camera CPU 9 performs the constant approximation of the characteristic of the focus sensitivity indicated by the solid line in FIG. 15, by utilizing expression (19). In expression (19), $S_0$ represents the focus sensitivity, and $c_0$ represents the correction coefficient for correcting the focus sensitivity. In FIG. 15, the camera CPU 9 divides an entire image height range into multiple image height ranges and performs the constant approximation to approximate a characteristic of the focus sensitivity as expressed by expression (19) in each divided image height range. Number of the divided image height ranges and a method of setting division positions can be arbitrary selected.

Expression (19) is an expression for approximating the characteristic of the focus sensitivity corresponding to the position of the focus detection point (in-focus target focus detection point) P1.

$$S(X, Y) = S_0 \times c_0 \qquad (19)$$

The correction coefficient $c_0$ can be acquired from a correction coefficient table prestored for each focal length in the storage area in the camera body 1 as in Embodiment 4. The correction coefficient $c_0$ is thus dependent on the focal length.

Next, at step 360, the camera CPU 9 corrects the focus sensitivity according to expression (19) by using the correction coefficient set at step 350 and information on the coordinates (X,Y) of the focus detection point. Embodiment 6 requires a smaller number of the correction coefficients than those in Embodiments 4 and 5 and thus requires less storage capacity than those at in Embodiments 4 and 5. When the focal length is longer than the predetermined value after step 360 or at step 140, the camera CPU 9 executes step 170.

The camera body 1 may store multiple approximation methods or multiple characteristics of the focus sensitivity and change the characteristic of the focus sensitivity to be used. For instance, in a case where the moving image capturing mode is selected and a moving object recognized by a face recognizer (not illustrated) or the like is followed, the characteristic of the focus sensitivity indicated by the dashed-dotted line in FIG. 13 is desirably used. On the other hand, in other cases, the constant approximation indicated by the black circles in FIG. 15 may be used. This is because the constant approximation provides approximation points discretely distributed with respect to the position of the focus detection position, and thus switching of the approximation points may make the user feel strange about a focus state with respect to the moving object. Accordingly, in the case of following the moving object in the moving image capturing mode, it is desirable to use the characteristic of the focus sensitivity in Embodiment 4 that continuously and smoothly varies with respect to the position of the focus detection position.

Although each of Embodiments 4 to 6 described the AF process performed in the lens-interchangeable camera system, the AF process can be applied to a lens-integrated image capturing apparatus. In addition, in the approximation of the focus sensitivity characteristic, it is only necessary to use at least one of the polynomial approximation, the linear approximation and the constant approximation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2014-224870, filed on Nov. 5, 2014 and No. 2014-180786, filed on Sep. 5, 2014 which are hereby incorporated by reference herein in their entirety.

What is claimed is:

1. An interchangeable lens apparatus provided with an image capturing optical system and being attachable to and detachable from an image capturing apparatus, the image capturing apparatus being configured to be able to detect a defocus amount of the image capturing optical system at plural different image heights using a signal acquired by photoelectric conversion of an optical image formed by the image capturing optical system, the interchangeable lens apparatus comprising:

a focus lens included in the image capturing optical system; and a memory configured to store information on a focus sensitivity indicating a relation between a unit movement amount of the focus lens and a displacement amount of the optical image, the information on the focus sensitivity including a plurality of information for enabling acquiring the focus sensitivity different depending on an image height and different depending on pupil division directions in a detection of the defocus amount.

2. An interchangeable lens apparatus according to claim 1, further comprising a processor configured to execute instructions stored in the memory to function as:

a sensitivity acquirer configured to receive, from the image capturing apparatus, information on the image height at which the defocus amount is detected and to acquire the focus sensitivity at the received image height by using the information on the focus sensitivity; and a sensitivity sender configured to send the acquired focus sensitivity at the image height to the image capturing apparatus, the image capturing apparatus being configured to calculate a drive amount of the focus lens by using the focus sensitivity and the defocus amount.

3. An interchangeable lens apparatus according to claim 1, further comprising a processor configured to execute instructions stored in the memory to function as:
   a sensitivity acquirer configured to receive, from the image capturing apparatus, information on the image height at which the defocus amount is detected and to acquire the focus sensitivity at the received image height by using the information on the focus sensitivity; and
   a drive amount calculator configured to calculate a drive amount of the focus lens by using the focus sensitivity at the received image height and the defocus amount received from the image capturing apparatus.

4. An interchangeable lens apparatus according to claim 3, wherein, when h represents the image height, d(h) represents the defocus amount at the image height h, and S(h) represents the focus sensitivity at the image height h, the drive amount calculator calculates the drive amount X of the focus lens by using the following expression:

$$X=d(h)/S(h).$$

5. The interchangeable lens apparatus according to claim 1, wherein the information on the focus sensitivity is a function enabling calculation of the focus sensitivity depending on the image height or a table containing the focus sensitivity corresponding to each image height.

6. The interchangeable lens apparatus according to claim 1, wherein the information on the focus sensitivity is information for enabling acquiring the focus sensitivity different depending on the image height and on an azimuth direction.

7. The interchangeable lens apparatus according to claim 1, further comprising a driving unit configured to drive the focus lens, wherein the driving unit drives the focus lens based on a movement amount of the focus lens received from the image capturing apparatus, the movement amount of the focus lens being obtained based on the information on the focus sensitivity which the interchangeable lens apparatus sends to the image capturing apparatus.

8. The interchangeable lens apparatus according to claim 1, wherein the information on the focus sensitivity includes one or more coefficients used in a focus sensitivity function that enables calculating the focus sensitivity corresponding to the defocus detection image height.

9. The interchangeable lens apparatus according to claim 1, wherein in each information of the plurality of information, a sagittal component and a meridional component are mixed at rates different depending on image heights.

10. The interchangeable lens apparatus according to claim 1,
    further comprising a processor configured to execute instructions stored in the memory to function as a flag sender,
    wherein the memory is configured to store flag information indicating whether the information on the focus sensitivity is stored in the memory, and
    wherein the flag sender configured to send the flag information to the image capturing apparatus.

11. The interchangeable lens apparatus according to claim 10,
    wherein the processor is further configured to execute instructions stored in the memory to function as a sensitivity sender configured to send the information on the focus sensitivity to the image capturing apparatus in response to receiving a request for the information on the focus sensitivity from the image capturing apparatus after the flag sender sends the flag information to the image capturing apparatus.

12. An image capturing apparatus attachable to and detachable from an interchangeable lens apparatus provided with an image capturing optical system including a focus lens, the image capturing apparatus comprising:
    a defocus detector configured to detect a defocus amount of the image capturing optical system at plural different image heights using a signal acquired by photoelectric conversion of an optical image formed by the image capturing optical system;
    a memory configured to store instructions; and
    a processor configured to execute the instructions to function as:
      a sensitivity acquirer configured to acquire a focus sensitivity indicating a relation between a unit movement amount of the focus lens and a displacement amount of the optical image based on information on the focus sensitivity and an image height at which the defocus amount is detected, the information on the focus sensitivity including a plurality of information for enabling acquiring the focus sensitivity different depending on an image height and different depending on pupil division directions in a detection of the defocus amount; and
      a drive amount calculator configured to calculate a drive amount of the focus lens using the focus sensitivity corresponding to the image height and the defocus amount.

13. An image capturing apparatus according to claim 12, wherein the sensitivity acquirer is configured to:
    send, to the interchangeable lens apparatus, the information on the image height at which the defocus amount is detected; and
    acquire, from the interchangeable lens apparatus, the focus sensitivity corresponding to the image height at which the defocus amount is detected.

14. The image capturing apparatus according to claim 12, wherein, when h represents the image height, d(h) represents the defocus amount at the image height h, and S(h) represents the focus sensitivity at the image height h obtained by the sensitivity acquirer, the drive amount calculator calculates the drive amount X of the focus lens by using the following expression:

$$X=d(h)/S(h).$$

15. The image capturing apparatus according to claim 12, wherein the information on the focus sensitivity includes one or more coefficients used in a focus sensitivity function that enables calculating the focus sensitivity corresponding to the defocus detection image height.

16. The image capturing apparatus according to claim 12, wherein in each information of the plurality of information, a sagittal component, and a meridional component are mixed at rates different depending on image heights.

17. The image capturing apparatus according to claim 12, wherein the sensitivity acquirer is configured to acquire the focus sensitivity after receiving, from the interchangeable lens, a flag information indicating whether the information on the focus sensitivity is stored in the memory of the interchangeable lens and the information on the focus sensitivity.

18. An image capturing apparatus attachable to and detachable from an interchangeable lens apparatus provided with an image capturing optical system including a focus lens, the image capturing apparatus comprising:

a memory configured to store instructions; and a processor configured to execute the instructions to function as:

a defocus detector configured to be able to detect a defocus amount of the image capturing optical system at plural different image heights using a signal acquired by photoelectric conversion of an optical image formed by the image capturing optical system; and an image height sender configured to send information on an image height at which the defocus amount is detected to the interchangeable lens apparatus, the interchangeable lens apparatus storing information on the focus sensitivity indicating a relation between a unit movement amount of the focus lens and a displacement amount of the optical image, the information on the focus sensitivity including a plurality of information for enabling acquiring the focus sensitivity different depending on the image height and different depending on pupil division directions in a detection of the defocus amount.

19. A non-transitory computer-readable storage medium storing a program configured to cause a computer in an interchangeable lens apparatus to perform a focus process, the interchangeable lens apparatus (a) being provided with an image capturing optical system including a focus lens, (b) being attachable to and detachable from an image capturing apparatus configured to be able to detect a defocus amount of the image capturing optical system at plural different image heights using a signal acquired by photoelectric conversion of an optical image formed by the image capturing optical system and (c) storing information on a focus sensitivity indicating a relation between a unit movement amount of the focus lens and a displacement amount of the optical image, the information on the focus sensitivity including a plurality of information for enabling acquiring the focus sensitivity different depending on an image height and different depending on pupil division directions in a detection of the defocus amount, the focus process including:

sending the information on the focus sensitivity to the image capturing apparatus configured to calculate a focus sensitivity using the information on the focus sensitivity depending on the image height and the defocus amount.

20. A non-transitory computer-readable storage medium storing a program configured to cause a computer in an image capturing apparatus to perform a focus process, the image capturing apparatus (a) being attachable to and detachable from an interchangeable lens apparatus provided with an image capturing optical system including a focus lens and (b) being configured to be able to detect a defocus amount of the image capturing optical system at plural different image heights using a signal acquired photoelectric conversion of an optical image formed by the image capturing optical system, the focus process comprising:

receiving information on the focus sensitivity indicating a relation between a unit movement amount of the focus lens and a displacement amount of the optical image stored in the memory of the lens apparatus, the information on the focus sensitivity including a plurality of information for enabling acquiring the focus sensitivity different depending on an image height and different depending on pupil division directions in a detection of the defocus amount;

acquiring focus sensitivity based on the received information on the focus sensitivity and an image height at which the defocus amount is detected; and calculating a drive amount of the focus lens using the focus sensitivity corresponding to the image height and the defocus amount.

21. A non-transitory computer-readable recording medium storing a program configured to cause a computer in an image capturing apparatus to perform a focus process, the image capturing apparatus (a) being attachable to and detachable from an interchangeable lens apparatus provided with an image capturing optical system including a focus lens and (b) being configured to be able to detect a defocus amount of the image capturing optical system at plural different image heights using a signal acquired by photoelectric conversion of an optical image formed by the image capturing optical system, the focus process comprising:

acquiring an image height at which the defocus amount is detected; and sending information on the image height to the interchangeable lens apparatus that stores information on the focus sensitivity, the focus sensitivity indicating a relation between a unit movement amount of the focus lens and a displacement amount of the optical image, the information on the focus sensitivity being a plurality of information for enabling acquiring the focus sensitivity different depending on the image height and different depending on pupil division directions in a detection of the defocus amount.

* * * * *